United States Patent

Haselwood et al.

[15] 3,651,471

[45] Mar. 21, 1972

[54] DATA STORAGE AND TRANSMISSION SYSTEM

[72] Inventors: Donald E. Haselwood, Deerfield; Carl M. Solar, Glenview, both of Ill.

[73] Assignee: A. C. Nielsen Company, Chicago, Ill.

[22] Filed: Mar. 2, 1970

[21] Appl. No.: 15,696

[52] U.S. Cl. ........ 340/172.5

[51] Int. Cl. ........ G06f 9/18

[58] Field of Search ........ 340/172.5

[56] References Cited

UNITED STATES PATENTS

| | | | |
|---|---|---|---|
| 3,266,018 | 8/1966 | Higgins | 340/172.5 X |
| 3,289,170 | 11/1966 | Currey et al. | 340/172.5 |
| 3,323,112 | 5/1967 | Haselwood et al. | 340/172.5 |
| 3,400,378 | 9/1968 | Smith et al. | 340/172.5 |
| 3,405,393 | 10/1968 | Haselwood | 340/172.5 |
| 3,408,629 | 10/1968 | Haselwood | 340/172.5 |

*Primary Examiner*—Raulfe B. Zache

*Attorney*—Mason, Kolehmainen, Rathburn & Wyss

[57] ABSTRACT

A system for economically monitoring via telephone a large number of remotely located television receivers or the like. Remotely located data handling systems check the status of receiver groups once every 30 seconds. Whenever a change in status is detected, the altered status is recorded as a "change line data set" in a continuously circulating memory which can store 40 such data sets. At periodic intervals a central unit contacts the remotely located data handling system via telephone. The data sets are then repeatedly transmitted to the central unit in the form of a frequency modulated audio tone. With the aid of a marker bit that reverses its sign each time the circulating memory fully circlates, the central unit is able to extract the 40 data sets from the modulated tone and is also able to check for transmission errors.

25 Claims, 2 Drawing Figures

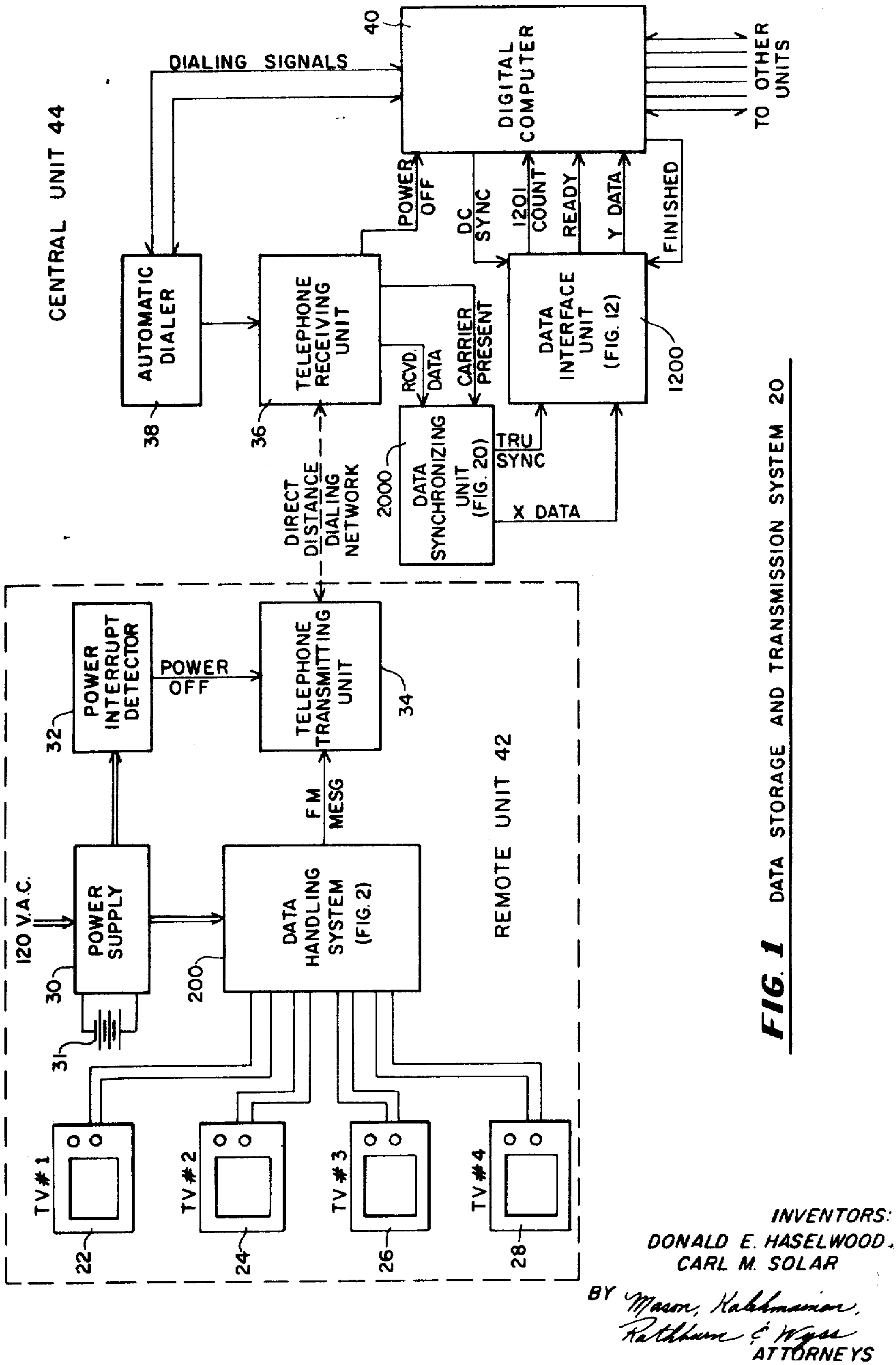
FIG. 1 DATA STORAGE AND TRANSMISSION SYSTEM 20
INVENTORS:
DONALD E. HASELWOOD,
CARL M. SOLAR
BY Mason, Kolehmainen, Rathburn & Wyss
ATTORNEYS

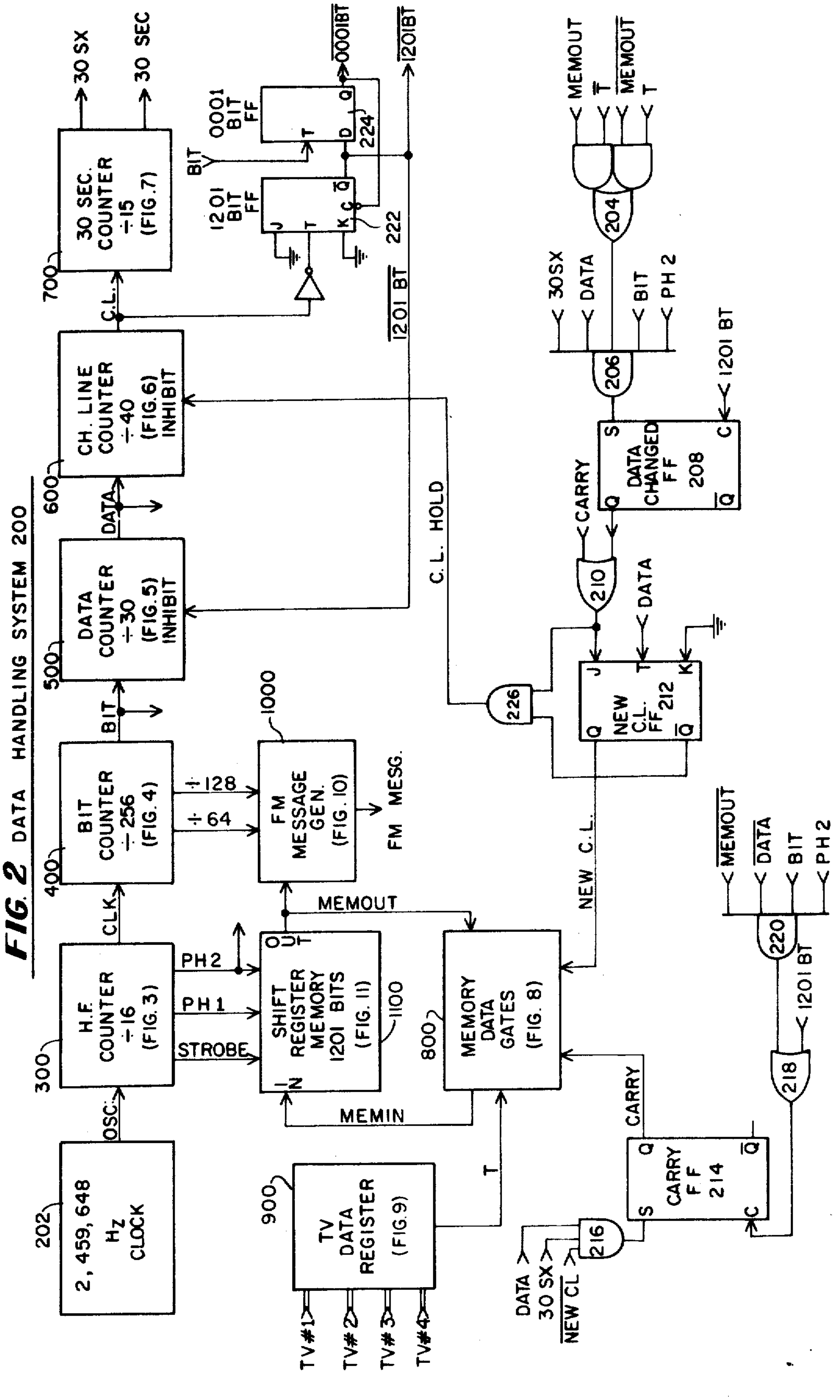
FIG. 2 DATA HANDLING SYSTEM 200

FIG. 3 CLOCK & H.F. COUNTER 300
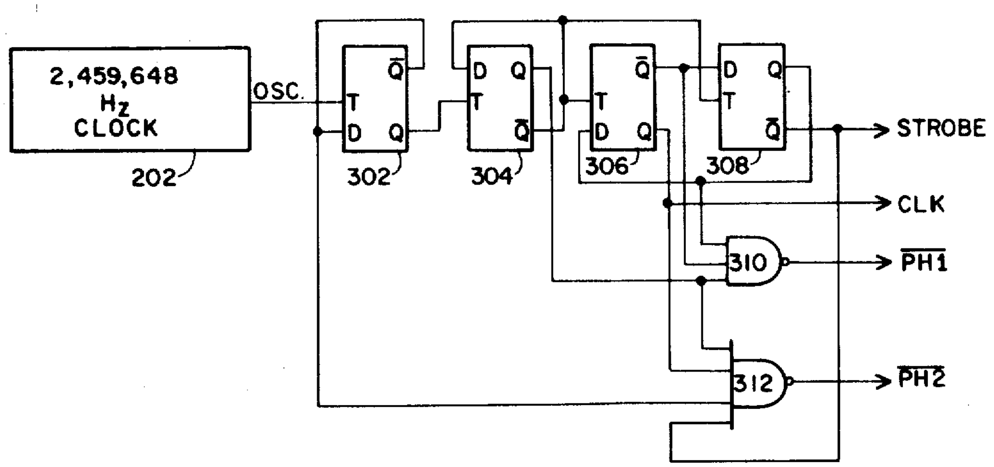
FIG. 4 BIT COUNTER 400
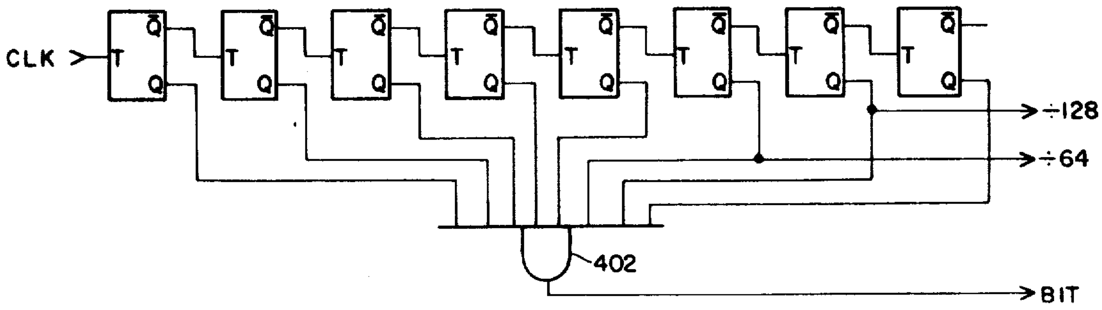
FIG. 5 DATA COUNTER 500
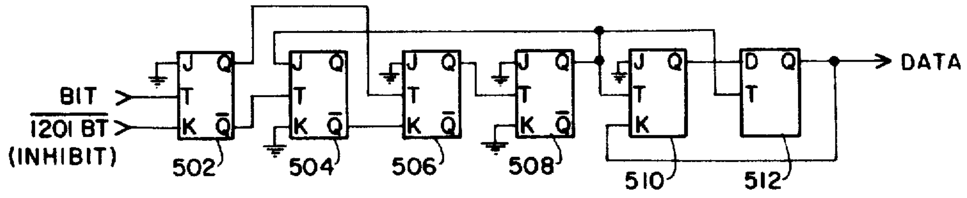

FIG. 6 CHANGE LINE COUNTER 600
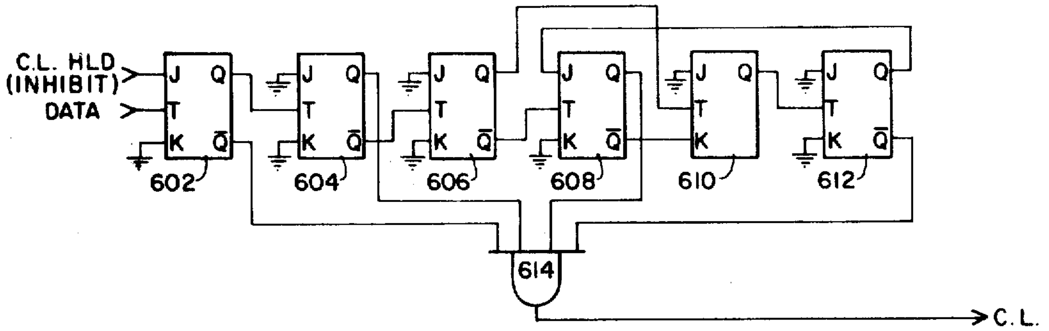
FIG. 7 30 SEC. COUNTER 700
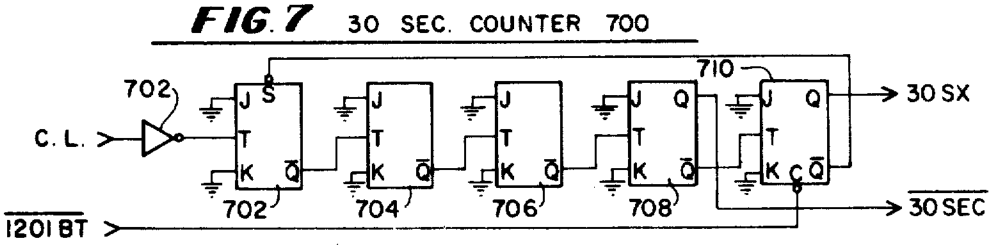
FIG. 8 DATA GATES 800
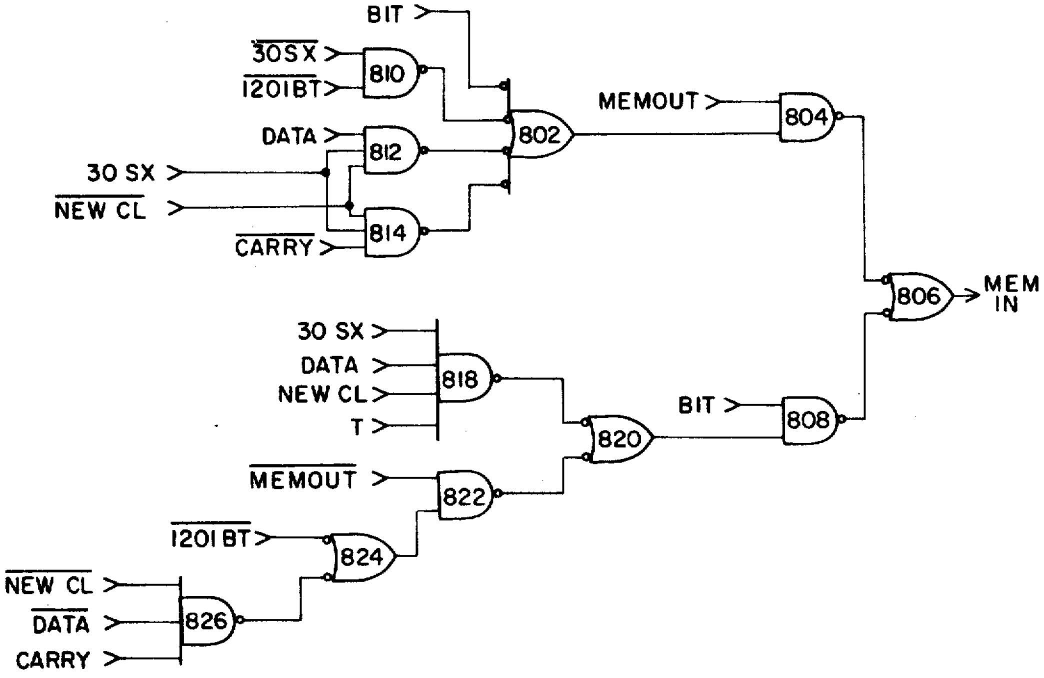

FIG. 9 T.V. DATA REGISTER 900
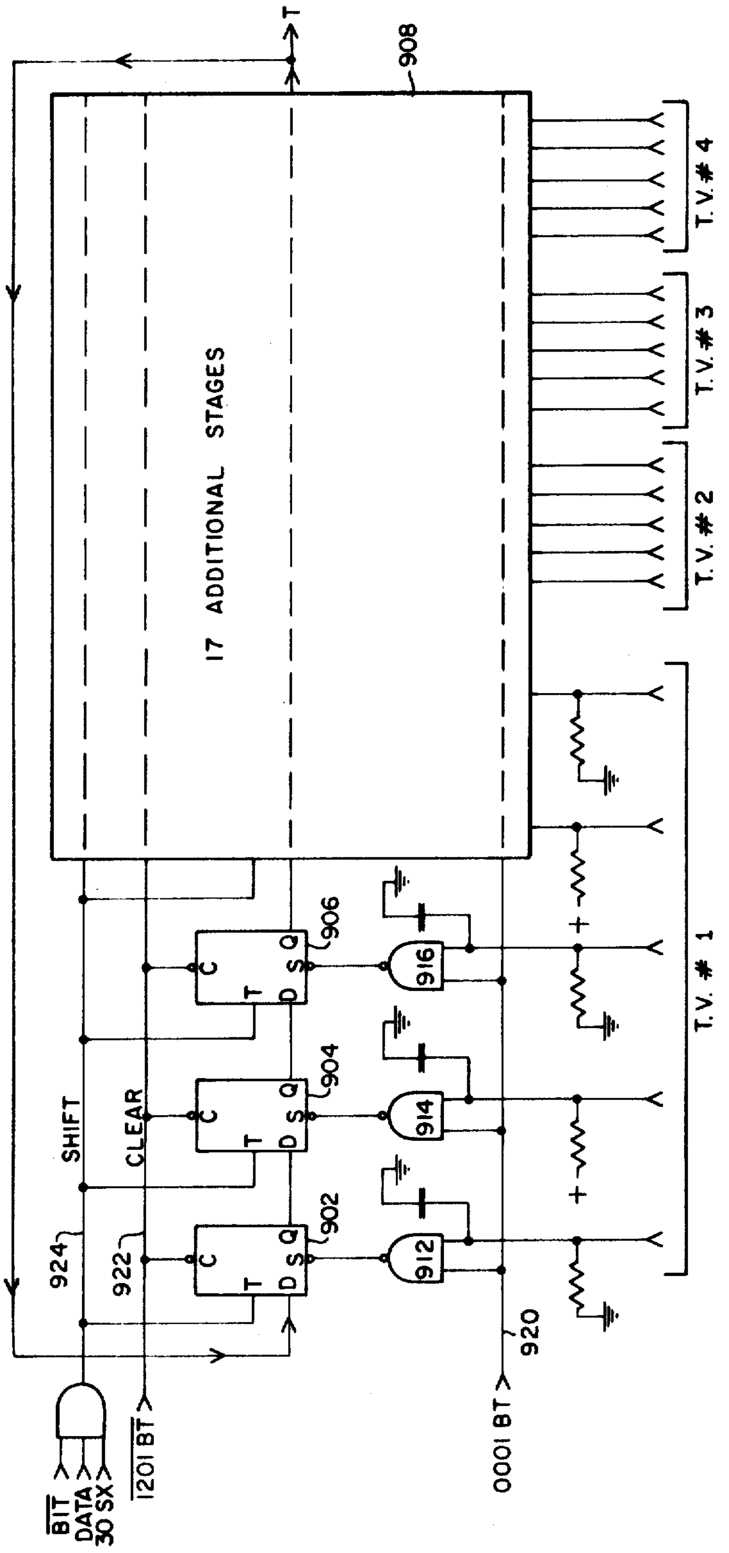

FIG.12 DATA INTERFACE UNIT 1200
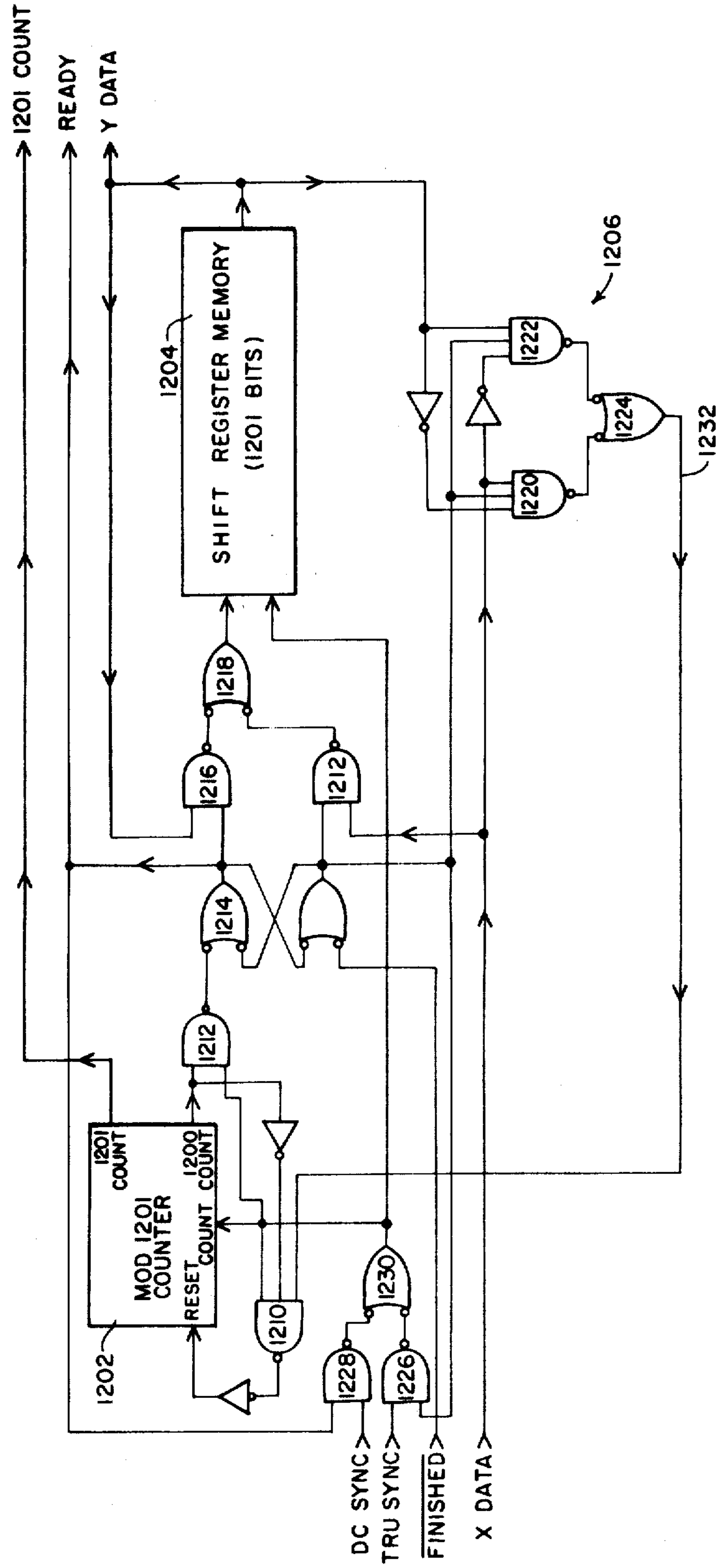
FIG 10 FM MESSAGE GENERATOR 1000
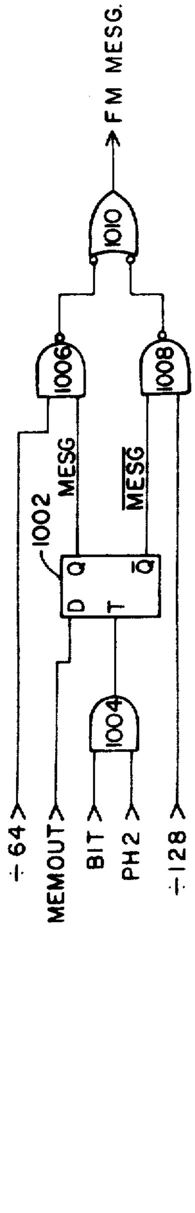

FIG. 11 SHIFT REGISTER MEMORY 1100
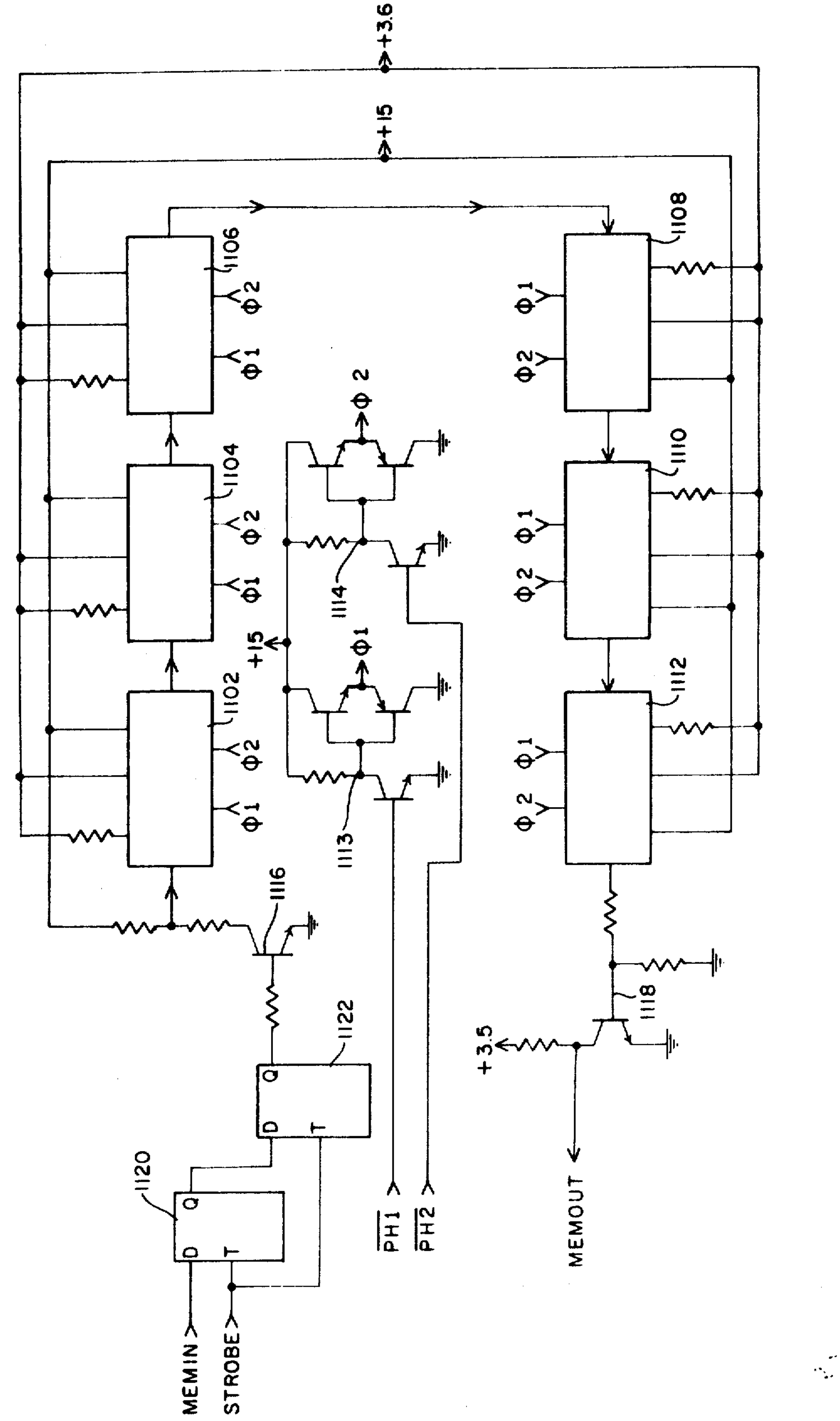

FIG. 13 COUNTER TIMING DIAGRAM
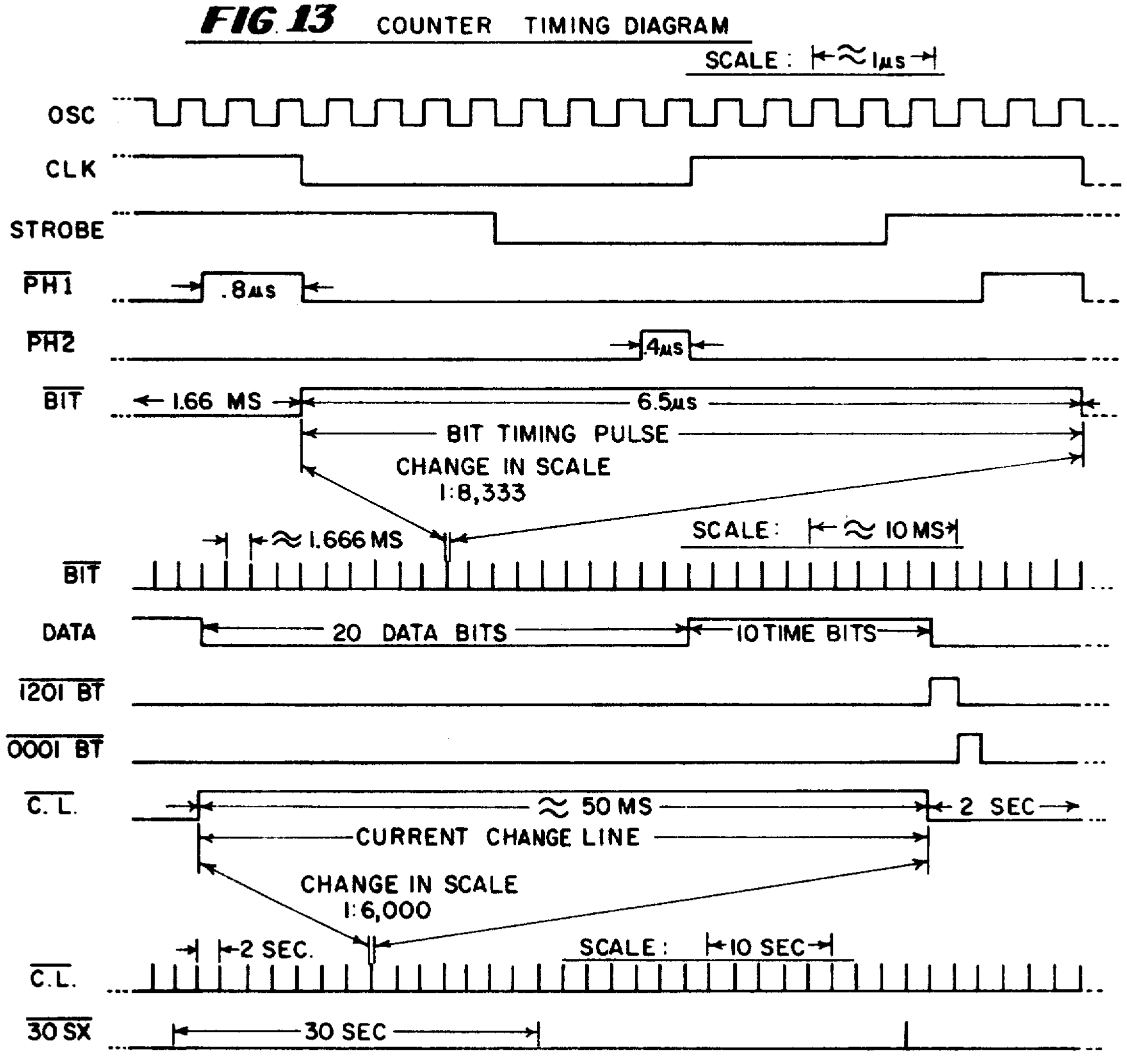
FIG. 14 MEMORY TIMING DIAGRAM
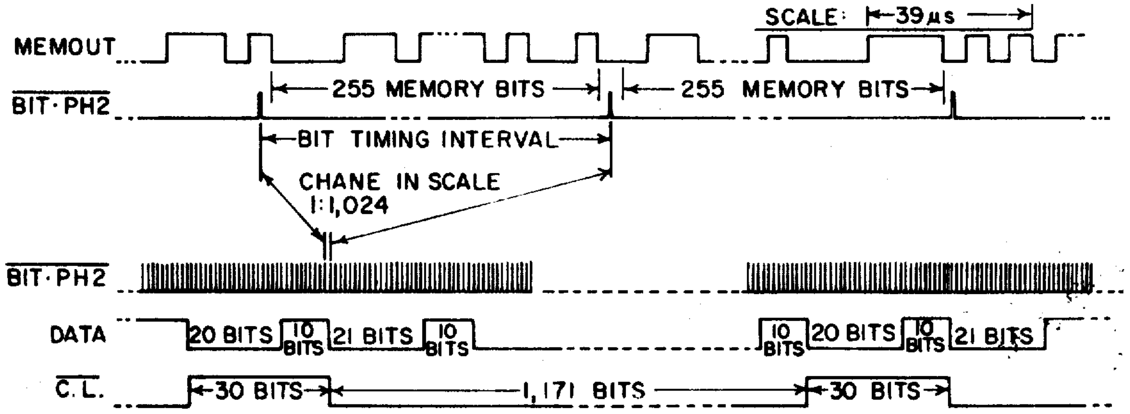

FIG. 15 FM MESSAGE GENERATION
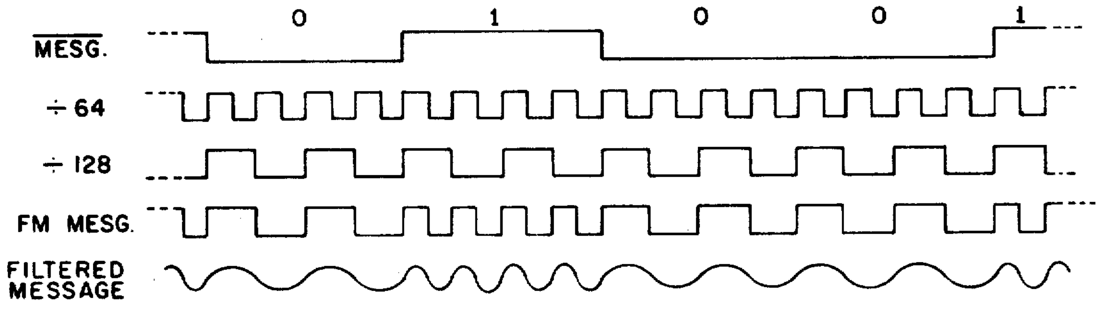
FIG. 16 NORMAL 30 SECOND COMPARISON TIMING DIAGRAM
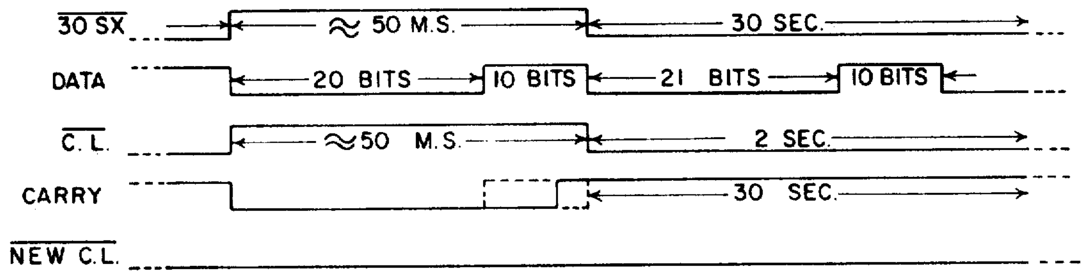
FIG. 17 NEW CHANGE LINE DUE TO TIME TURNOVER
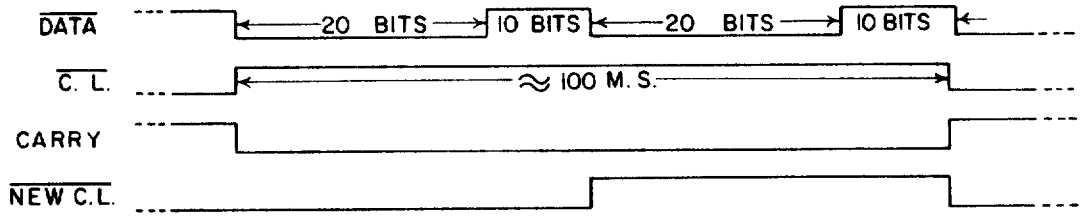
FIG. 18 NEW CHANGE LINE DUE TO NEW DATA
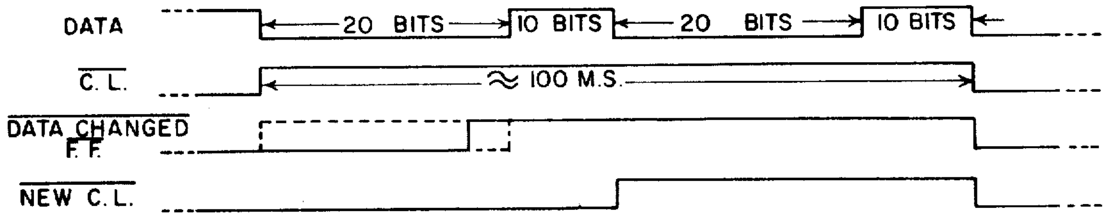
FIG. 19 DATA TRANSMISSION ORDER
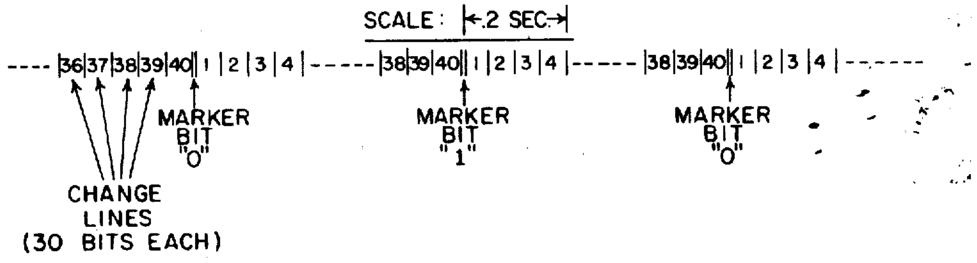

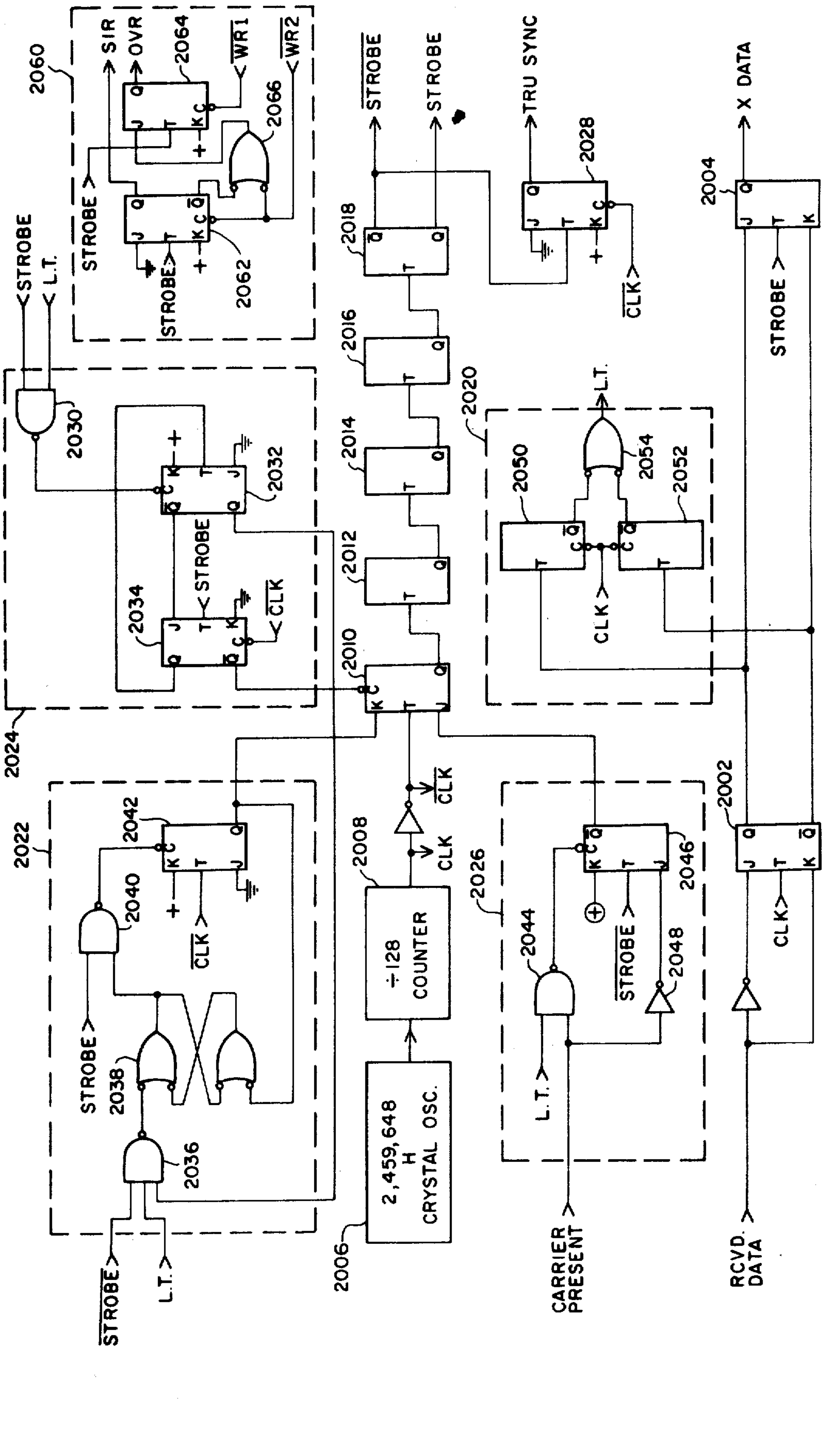
FIG. 20 DATA SYNCHRONIZING UNIT 2000

DATA STORAGE AND TRANSMISSION SYSTEM

TABLE OF CONTENTS

| | Column |
|---|---|
| Background of the Invention | 1 |
| Summary of the Invention | 1 |
| Brief Description of the Drawings | 4 |
| Description of the Preferred Embodiment | 5 |
| I. The Overall System | 5 |
| II. The Data Handling System | 7 |
| A. Overview of the System | 7 |
| B. Details of the System | 14 |
| III. The Data Interface Unit | 24 |
| IV. Computer Error Checking | 26 |
| V. Data Synchronizing Unit | 26 |
| Claims | 30 |

BACKGROUND OF THE INVENTION

The present invention relates to data storage and transmission systems and more particularly to monitoring systems for collecting data at remote locations and for transmitting this data to a central location. The present invention is particularly suitable for use as a television receiver monitoring system for collecting data as to the viewing habits of television viewers and for transmitting this data to a central location for statistical compilation.

In the past it has been customary to provide an arrangement which checks the status of each monitored television receiver about once every 5 minutes via telephone or via rented telegraph lines. Such arrangements use up a tremendous amount of telephone or telegraph time and thus are quite costly to operate. When the tuning of the home receivers does not change over an extended period, such arrangements collect a tremendous amount of duplicate data and, therefore, consume large amounts of telephone or telegraph time in merely checking to see if any monitored receiver has changed its status. Since sampling is performed only once every 5 minutes, such arrangements can miss short viewing intervals of 5 minutes or less and often cannot distinguish an extremely brief viewing interval from viewing intervals 5 minutes or more in length.

Attempts to provide improved data collecting arrangements have heretofore been largely uncuccessful. Some workers have attempted to provide systems which record the status of a television receiver on magnetic tape several times a minute with the tape being played back upon command from a central location at periodic intervals, say once a day or once a week. Such systems have generally proved unsatisfactory because of the expense and complication of providing a remotely controllable magnetic tape recording and playback mechanism. Magnetic tape would necessarily have to be used by such a system, since no other storage medium could hold the huge amount of data that would be generated by such a system. The chances of data errors in such a system are fairly great, since large amounts of data are first stored on tape and are then transferred over noisy telephone lines to a central station.

SUMMARY OF THE INVENTION

A primary object of the present invention is to provide a data storage and transmission system that can check the tuning condition and the on-or-off status of monitored television receivers several times a minute, that can record data characterizing the condition and status of the receivers, and that can transmit the recorded data rapidly and accurately to a central location over conventional telephone lines.

Another object is to design such a system which includes only memories of limited size and circuits of minimum complexity.

A further object of the present invention is to design such a system so that checks for transmission errors are easily carried out and so that repeat transmissions are automatically commenced if any transmission errors are found.

In accordance with these and many other objects, an embodiment of the present invention comprises briefly a data storage and transmission system which can collect data characterizing tuning condition and on-or-off status of a large number of television receivers; store this data temporarily at remote locations; and then periodically transfer this data over long distance telephone lines to a centrally located digital computer. A data handling system is provided for each cluster of television receivers located within a signal building, home, or area. The data handling systems check the tuning condition and also the on-or-off status of each receiver within each cluster periodically, for example, once every 30 seconds. The data handling systems do not, however, record data characterizing the tuning condition and on-or-off status of the monitored receivers every thirty seconds. Data is collected only after a monitored receiver is re-tuned or is turned on or off. This data, along with the time that elapses before another tuning condition or on-or-off status change occurs, is compiled into a data set that is called a "change line" or "change line data set" and is stored within the data handling system.

Each data handling system includes a memory with a capacity to store a fixed number of such change lines. When more than that number of change lines are recorded, the newest change lines replace the oldest change lines, and the oldest change lines are discarded. Since change lines are recorded only when the tuning condition or on-or-off status of a receiver is altered, this memory can be small in size, yet it will still store sufficient data so that the central computer need not collect the data more often than once every 20 minutes or so during the prime viewing hours, and only once every half day or so at other times. This memory is far more compact and inexpensive than the magnetic tape memory required by conventional systems having similar time resolution capabilities.

The memory operates continuously and repeatedly presents the stored change lines in the form of a frequency modulated tone signal suitable for telephone transmission. Periodically the system contacts all of the remote data handling systems via telephone and monitors the frequency modulated signals. These tone signals are translated back into digital data. The system then checks the data against itself for transmission errors and stores the data for statistical processing. If any transmission errors are found, the stored data is discarded and the transmission procedure is repeated.

When the monitored receivers are checked, data characterizing the current tuning condition and on-or-off status of the monitored television receivers is compared with the data portion of the change line most recently placed into the system memory (this change line will hereinafter be called the "current change line"). If the two data sets agree, then another portion of the current change line which serves as a record of elapsed time is incremented by one to indicate the passage of another fixed length time interval. If the two data sets disagree, then a new current change line is created. The data characterizing the present tuning condition and on-or-off status of the monitored receivers is loaded into the memory as the data portion of this new current change line, and the time portion of this new current change line is set to zero. As a result of this procedure, each change line within the memory includes a data portion which characterizes the tuning condition and on-or-off status of the monitored receivers during a specific time period and a time portion which contains a number equal to the number of fixed length time intervals which comprise the specific time period. In the preferred embodiment of the present invention, this is a binary number equal to the number of 30 second intervals which together comprise the specific time period, since the monitored receivers are checked once every 30 seconds.

A special marker bit within each of the data handling systems' memories is transmitted to the central computer as part of the frequency modulated tone signal and is reversed in sign each time it is transmitted. Since all the other data transmitted is normally not reversed in sign, the marker bit is easily found by the centrally located digital computer. The centrally located digital computer compares the bits comprising two successive transmissions and chooses as the marker bit the only bit which has changed its sign. Once having found where the marker bit lies, the computer can easily determine where within the transmitted signal each individual change line begins and ends. The use of a marker bit enables the centrally located digital computer to identify the various change lines without the necessity of two way communication between the computer and the data handling system. If more than one bit is found to have changed its sign, this is positive proof that a transmission error has occurred. Hence, the centrally located digital computer monitors successive transmissions continuously until two are finally received without error.

If an unusually long interval of time passes with no change in the tuning condition or the on-or-off status of the monitored television receivers, the storage capacity of the time portion of the current change line can be exceeded. When this happens, the time portion of the current change line is set to zero and a new current change line is automatically loaded into the memory. When the central computer comes upon a change line whose time portion is set to zero, the computer knows that such an overflow has occurred and is able to interpret the data accordingly.

In the preferred embodiment, a dynamic shift register type of memory is used in the data handling systems. This memory is of a type which must circulate at a certain minimum speed if data is not to be lost. The optimum circulation speed of this memory is such that data is presented at too fast a rate for telephone transmission. Therefore a sampling procedure is used to reduce the data presentation rate. In the preferred embodiment of the present invention, the memory contains 1201 bits, and only 1 out of every 256 memory output bits is sampled. This procedure allows the entire contents of the memory to be fed out at 1/256th of the basic memory circulation speed. In this manner, data is fed out of the memory at a speed that is suitable for telephone transmission. If a different data presentation rate is desired, some other rate of output sampling can be used. For example, the rate can be doubled by sampling once every 128 memory output bits. This same technique can be used with memories of other sizes, so long as the number representing the memory bit capacity and the number representing the rate of output sampling have no common primes.

The frequency modulated tone signal is one of two audio tones. If a memory output bit is a "0" bit, a first of the two tones is transmitted; if it is a "1" bit, the second tone is transmitted. The FM generator comprises a single flip-flop having an input connected to the memory output and having an output which gates one or the other of the audio tones into the frequency modulated tone signal depending upon its state.

Since the only arithmetic performed within the data handling units is that of adding "1" to the time interval count stored in the time portion of the current change line, a very simple form of arithmetic unit suffices. As the time portion of the current change line flows out of the memory one bit at a time, the bits are reversed in sign before being returned to the memory, up to to and including the first "0" bit which flows from the memory. After a "0" bit is encountered, the signal reversal process is terminated, and the remaining bits are returned to the memory unaltered. If a "0" bit is not encountered, this indicates that the capacity of the time portion of the current change line has been exceeded. Such an occurrence initiates the creation of a new current change line, as explained above.

A power interrupt detector generates a tone signal whenever a local power failure causes a data handling system to switch over to its standby emergency batteries. This tone signal is transmitted along with the frequency modulated tone signal to the central computer. This tone signal tells the central computer that the remote unit will fail to respond if the batteries are fully discharged before power is restored.

When the transmitted data reaches the centrally located digital computer, two successive transmissions of data are compared bit by bit to assure that no transmission errors have occurred. If both transmissions are error-free, then only the marker bit is found to have reversed its sign. In this case one of the two transmissions is stored for statistical processing along with an indication as to the location of the marker bit. If more than one bit is found to have reversed its sign, however, this indicates that transmission errors have occurred. The above process is then repeated until finally two consecutive transmissions are found which contain only one bit that has reversed its sign.

By only recording data when there has been a change in the tuning condition or the on-or-off status of a monitored receiver, the present invention significantly reduces the amount of storage space required within the data handling systems, thereby reducing their cost, and simultaneously minimizes the number of telephone data collections which must be made. Telephone charges are thereby minimized, and yet a more accurate survey is obtained than any previously attainable. An interface unit associated with the central computer does much of the routine work of sorting and error-checking the incoming data. This performance of routine work by the interface unit together with the reduced volume of data attained through the use of change lines significantly reduces the amount of computer time required to process the incoming data. Hence, the present invention is able to provide an accurate survey at a lower cost than was possible with any previous arrangement.

Further objects and advantages of the present invention will become apparent as the following detailed description proceeds, and the features of novelty which characterize the present invention will be pointed out with particularity in the claims annexed to and forming a part of this specification.

BRIEF DESCRIPTION OF THE DRAWINGS

For a further understanding of the present invention, reference will be made to the drawings wherein;

FIG. 1 is a block diagram of a data storage and transmission system designed in accordance with the present invention;

FIG. 2 is a partly diagrammatic and partly logical representation of a data handling system suitable for use at a remote data collection point in the data storage and transmission system shown in FIG. 1;

FIG. 3 is a logical representation of the high frequency counter used in the data handling system shown in FIG. 2;

FIG. 4 is a logical representation of the bit counter used in the data handling system shown in FIG. 2;

FIG. 5 is a logical representation of the data counter used in the data handling system shown in FIG. 2;

FIG. 6 is a logical representation of the change line counter used in the data handling system shown in FIG. 2;

FIG. 7 is a logical representation of the 30 second counter used in the data handling system shown in FIG. 2;

FIG. 8 is a logical representation of the memory data gates used in the data handling system shown in FIG. 2;

FIG. 9 is a logical representation of the TV data register used in the data handling system shown in FIG. 2;

FIG. 10 is a logical representation of the FM message generator used in the data handling system shown in FIG. 2;

FIG. 11 is a logical representation of the shift register memory used in the data handling system shown in FIG. 2;

FIG. 12 is a logical representation of the data interface unit used in the data storage and transmission system shown in FIG. 1;

FIG. 13 is a timing diagram illustrating the time and phase relationships between the various counter output signals within the data handling system shown in FIG. 2;

FIG. 14 is a timing diagram illustrating the time relationships between the memory output signal and the bit, data, and current change line signals within the data handling system shown in FIG. 2;

FIG. 15 is a timing diagram illustrating the various waveforms present within the FM message generator shown in FIG. 10;

FIG. 16 is a timing diagram of waveforms which occur within the data handling system shown in FIG. 2 once every 30 seconds when both the 30 second (30 SX) and current change line signals (C.L.) are simultaneously presented, and when no new change line is stored in the system memory;

FIG. 17 is a timing diagram of waveforms which occur when a new change line is fed into the memory of the data handling system shown in FIG. 2, due to time turnover;

FIG. 18 is a timing diagram of waveforms which occur when a new change line is fed into the memory of the data handling system shown in FIG. 2, due to a change in the data presented by the monitored receivers;

FIG. 19 is a timing diagram illustrating the order in which change line data sets are transmitted from the data handling system shown in FIG. 2 and illustrating the placement and polarity reversals of the marker bit; and FIG. 20 is a logic diagram of the data synchronizing unit used in the data storage and transmission system shown in FIG. 1.

DESCRIPTION OF THE PREFERRED EMBODIMENT

1. THE OVERALL SYSTEM

Referring now to the drawings, FIG. 1 shows a block diagram of a data storage and transmission system designed in accordance with the present invention and indicated generally by the reference numeral 20. The system 20 includes basically a central unit 44 connected by the telephone direct distance dialing network to a plurality of remote units such as the typical remote unit 42. The remote unit 42 includes anywhere from one to four monitored television receivers 22, 24, 26, and 28 each of which supplies five bits of tuning condition and on-or-off status data to a data handling system 200. The data handling system 200 generates an FM MESG (frequency modulated message) signal. This FM MESG signal contains data characterizing the tuning condition and on-or-off status of the monitored receivers both currently and in the recent past. The FM MESG signal is continuously fed to a telephone transmitting unit 34 for transmission to the central unit 44.

The data handling system 200 includes a 1201 bit circulating memory with sufficient capacity to store 40 30-bit change lines and one marker bit. Each change line includes a 20-bit data portion and a 10-bit time portion. The data portion contains four 5-bit numbers which characterize the tuning condition and the on-or-off status of the four monitored television receivers during some specific time interval, and the time portion contains a binary number which specifies the duration of the specific time interval. As the memory circulates, its contents are continuously presented as the FM MESG signal. The marker bit is reversed in sign each time the memory circulates.

The telephone transmitting unit 34 is a conventional telephone signal transmission unit which goes "off hook" for a period of 30 seconds or so in response to a ringing signal, and which then transmits the FM MESG signal and also a POWER OFF tone directly to the central unit 44 via the direct distance dialing network. Since the unit 34 does not have to receive any data from the central unit 44 other than the ringing signal which places it "off hook," the unit 34 can be extremely simple. Such units are widely used in systems which transmit a brief recorded message in response to a ringing signal, and therefore no detailed description of the unit 34 is included with this specification. Other than the ringing signal, no signals need to flow from the central unit 44 to the remote unit 42. This greatly simplifies the problems of system design and coordination and makes it impossible for any data to be lost if another telephone accidentally makes contact with the remote unit 42.

Power for the data handling system 200 and for the telephone transmitting unit 34 comes from batteries 31 which are trickle charged by a power supply 30 connected to a 120 volt AC source of potential. Electrical power interruptions in the 120 volt AC source are detected by a power interrupt detector 32 which generates a 367 cycle POWER OFF tone whenever an interruption occurs. This POWER OFF tone is fed directly to the telephone transmitting unit 34 for transmission to the central unit 44.

The central unit 44 includes a conventional digital computer 40 and a conventional telephone receiving unit 36. The computer 40 is connected to the receiving unit 36 by a data interface unit 1200 and a data synchronizing unit 2000 and also by a conventional automatic dialer 38. When data is to be transmitted to the central unit 44 from a remote unit, the digital computer 40 generates dialing signals which are supplied to the automatic dialer 38. The automatic dialer 38 generates the necessary "touch tones" to establish a telephone connection between the telephone receiving unit 36 and a remote telephone transmitting unit, for example the unit 34. The transmitting unit 34 then transmits to the telephone receiving unit 36 both the FM MESG signal and the POWER OFF tone signal. The telephone receiving unit 36 translates the POWER OFF tone signal into a digital POWER OFF signal which is fed directly to the digital computer 40. It also translates the FM MESG signal into a digital RCVD. DATA signal which is fed to the data synchronizing unit 2000 and generates a CARRIER PRESENT signal whenever the FM MESG signal carrier is being received. In the preferred embodiment, the unit 36 is a DATAPHONE (registered trademark) telephone receiving unit model 202C manufactured by Western Electric Company, Incorporated.

The data synchronizing unit 2000 converts the relatively unstable RCVD. DATA signal into a precisely formed X DATA signal. The unit 2000 also generates TRU SYNC (telephone receiving unit sync) pulses which strobe the X DATA signal into the data interface unit 1200. The CARRIER PRESENT signal is also used by the unit 2000 to reduce the time which it takes for the unit 2000 to lock into phase synchronization with the data bits comprising the RCVD. DATA signal. The unit 2000 is largely responsible for the high degree of accuracy of the data transmission portions of the present invention.

The X DATA signal can be fed directly into the digital computer 40, and then the computer 40 can be used to analyze the X DATA signal to determine the location of the various transmitted data sets. This would be inefficient, however, since the transmission rate of the X DATA signal is very slow in comparison to the rate at which the computer 40 can work. Therefore, a data interface unit 1200 is used to store the X DATA signal, to check it for transmission errors, and to then present it at high speed to the digital computer 40 in the form of a Y DATA signal. The data interface unit 1200 continuously monitors the X DATA signal until it has twice accurately received the 1201 data bits transmitted by the remote unit 42. Every bit, excepting the marker bit, must be identically received twice in succession before one of the recorded sets of 1201 bits is presented to the digital computer 40. This error-checking procedure can be completed in 4 seconds, but it may take much longer if transmission errors are encountered. If the procedure lasts for more than 30 seconds, the transmitting unit 34 may go off hook before the transmitted data is accurately received. If this happens, the remote unit 42 is contacted a second time, and the entire procedure is repeated.

When the unit 1200 has accurately received the transmitted data, it generates a READY signal. This signal initiates an interrupt of the digital computer 40. The computer 40 then receives one set of data from the data interface unit 1200 in the form of a Y DATA signal. In the embodiment shown, the Y DATA signal presents one data bit each time the data interface unit 1200 receives a DC SYNC (digital computer synchronization) signal from the computer 40. Hence, the transfer of data into the computer 40 is performed at whatever speed is most suitable for the computer 40. Alternatively, the bits comprising the Y DATA signal can be presented to the digital computer 40 in parallel rather than serially. When the computer 40 has received and stored the Y DATA signal, it generates a FINISHED signal which prepares the data interface unit 1200 for reception of the next transmission.

The transmitted data is now sorted by the digital computer 40 and is added to the statistical base from which viewer preference for TV programs is extracted. The digital computer 40 knows that the thirty bits of data immediately preceding the marker bit signal comprise the current change line, and that each of the 39 30-bit data sets which precedes the current change line comprises a distinct change line. The computer 40 is equipped with an internal clock, and is thus able to determine the exact time when the incoming data is first received. This time defines the end of the time interval encompassed by the current change line (the 40th change line in FIG. 19). From this time, the digital computer 40 subtracts the time represented by the time portion of the current change line to obtain a time which defines the beginning of the time interval encompassed by the current change line and also the end of the time interval encompassed by the next most current change line (the 39th change line in FIG. 19). The digital computer 40 repeats this calculation for each change line, and is thus able to determine the time interval encompassed by the data portion of each of the 40 change lines. Other sources within the computer 40 are then utilized to find out what programs were on what channels during the relevant time intervals, and the computer 40 is thus able to determine what programs the viewers of the monitored receivers were viewing at all relevant times. Knowing this, the computer 40 can then compile statistics as to how many viewers were watching each portion of each individual show. The particular manner whereby statistical data and ratings are compiled is beyond the scope of this application and is not discussed here in detail.

II. THE DATA HANDLING SYSTEM

A. Overview of the System

The details of the data handling system 200 are shown in FIG. 2 in block diagram form. The data handling system 200 examines the condition of four monitored television receivers once every 30 seconds. Whenever the condition of one or more of the sets has changed, the system 200 transfers a 20-bit data set from the monitored receivers, through a TV data register 900, through an array of memory data gates 800, and into a shift register memory 1100 as part of a 30-bit "change line" of data. Each 30-bit "change line" or "change line data set" thus specifies the tuning condition and the on-or-off status of the four monitored receivers during a time interval which extends from the time when a 20-bit data set is loaded into the memory 1100 to the time when another 20-bit data set is similarly loaded into the memory 1100. The name "change line" comes from the fact that each data grouping placed within the memory 1100 is recorded immediately following a "change" in the condition or status of one or more receivers, rather than at uniformly spaced points in time. This procedure makes it possible to construct the data handling system 200 with a small, compact memory containing a minimum number of integrated components.

The shift register memory 1100 has the capacity to store 1,201 bits of information. 1,200 bits of storage space are used to store forty 30-bit change lines, and the remaining one bit of storage space (hereinafter called the "marker bit" or the "1201st bit" storage space) is used to aid the central unit 44 (FIG. 1) in determining the ordering of data, as has been explained. The 1,201 data bits are continuously circulated out of the memory 1100 in the form of a MEMOUT (memory output) signal; through the memory data gates 800; and back into the memory 1100 in the form of a MEMIN (memory input) signal. Whenever a new change line is fed into the memory 1100, the oldest change line is discarded. Hence, the memory 1100 always contains the 40 most recently recorded change lines.

Each 30-bit change line contains two portions, as is shown in the lower half of FIG. 14. A first portion is called the data portion. The data portion contains 20 data bits, 5 of which are allotted to each of the four monitored television receivers. Usually 4 of these 5 bits are used to specify the tuning condition and the on-or-off status of a monitored receiver, and the remaining bit is a parity bit that is used for error detecting. A second portion is called the time portion. The time portion contains 10 data bits all of which are used to store a binary number that specifies the number of 30-second intervals which elapse between the times when successive change lines are recorded. A DATA signal (FIG. 14) indicates whether the time or data portion of a change line is flowing from the memory 1100 in the form of the MEMOUT signal. When the DATA signal is present (negative), the data portion of a change line is flowing from the memory. When the DATA signal is absent (positive), the time portion of a change line is flowing from the memory. When the most recently recorded or "current" change line and the marker bit flow from the memory 1100, a C. L. (current change line) signal is present (negative), as shown in the lower portion of FIG. 14. The DATA signal remains present (negative) for a slightly longer time interval immediately following termination of the C. L. signal to allow the marker bit to flow from the memory 1100 without disrupting the precise timing relationship between the DATA signal and the flow of change lines from the memory 1100.

As the memory 1100 continuously circulates its data, the MEMOUT signal is fed continuously into an FM message generator 1000. The generator 1000 translates the memory data bits into the FM MESG (frequency modulated message) signal that is suitable for telephone transmission. FIG. 19 shows the exact order in which data is transmitted. The change lines are transmitted serially starting with the first change line (the oldest in time) and ending with the 40th or current change line (the newest in time). Each change line takes about 50 milliseconds to transmit, so the entire set of 40 change lines can be transmitted in about 2 seconds. Between each transmission of the 40 change lines, the marker bit or 1201st bit is transmitted. As shown in FIG. 19, the polarity or sign of the marker bit is reversed after each transmission. If the marker bit is "0" during a given transmission, during the next transmission it is a "1"; during the next a "0"; and so on. The marker bit always comes after the fortieth or current change line and just before the first change line.

The memory 1100 and the FM message generator 1000 operate continually, and thus the FM MESG signal is always present, ready for transmission at any time.

Changes in the tuning condition or on-or-off status of the monitored receivers are detected by a comparator gate 204. Every 2 seconds data from the four monitored television receivers is loaded into the TV data register 900. Every 30 seconds, simultaneously with the serial outputting of the data bits which comprise the 40th or current change line from the memory 1100, the contents of the TV data register 900 are presented in the form of a T signal. The MEMOUT and T signals are fed into the comparator gate 204, and the output of the comparator gate 204 is fed through a blocking gate 206 which is strobed by timing signals so as to pass signals only when the data portion of the current change line is flowing from the memory 1100. If the data portion of the current change line and the data presented by the TV data register 900 are identical to one another, no signal flows from the comparison gate 204. This indicates that the tuning condition and the on-or-off status of the monitored receivers have not changed. A data changed flip-flop 208 remains cleared and does not cause a new change line flip-flop 212 to generate a NEW C.L. (new change line) signal. Hence, a new change line is not created. The sequence of signals is shown in FIG. 16. The data stored within the data register 900 is updated every 2 seconds. If the tuning condition or the on-or-off status of a monitored receiver has changed, then one or more of the bits presented to the comparator gate 204 by the MEMOUT signal disagree with the bits presented by the T signal. When this happens, one of the two AND gate inputs to the comparator gate 204 is fully enabled to pass a signal through the gate 208 to the set or S terminal of the data changed flip-flop 208. This signal sets the data changed flip-flop 208, and a signal appears at the Q output of the data changed flip-flop 208. This signal passes through an OR gate 210 and enables the J input of a new change line flip-flop 212, as shown in FIG. 18. After the 40 or current change line has completely passed through the memory data gates 800 and just as the marker bit appears in the MEMOUT signal, the leading edge of the DATA signal toggles the flipflop 212 and causes the appearance of a NEW C. L. (new change line) signal at the output of the flip-flop 212. The NEW C. L. signal is fed to the memory data gates 800. The NEW C. L. signal commands the memory data gates 800 to discard the old marker bit and the first change line, which are now about to flow from the memory 1100, and to replace them with the 20-bit T signal from the TV data register 900, with 10 "0" bits and with a new marker bit. In this manner, a new current change line is created and is fed into the memory 1100 in the same position where the former first change line and the old marker bit were previously stored. The last element or bit that was formerly part of the first change line now becomes the new marker bit, and the numbering of the change lines shifts all the way down the line. Hence, the change line just created is now numbered the 40th or current change line, and the data set immediately following the new marker bit is now numbered the first change line. In this manner, 40 records of changes in the condition or status of the four monitored television receivers are continuously maintained within the memory 1100.

An accurate record is also kept of the time during which each change line is the first or current change line. This record is maintained in the 10-bit time portion of each change line. The time portion contains a binary number which represents the number of 30-second time intervals which elapse between the formation of each change line and the formation of the next change line. When a change line is first fed into the memory 900, the time portion is set to zero, as was mentioned above. Thereafter at 30second intervals (when the data within this newest change line is compared to the data within the TV data register 900) the number within the time portion is incremented by one, and is thus kept equal to the number of 30second intervals which have elapsed since the change line was first created. The mechanism for incrementation of this number by one comprises the time portion of the change line, which functions as a serial arithmetic accumulator; a gate 220 and the memory data gates 800, which together function as serial arithmetic logic elements; and a carry flip-flop 214, which functions as a control element and storage location for the serial arithmetic carry bit. The incrementation process is initiated by setting the carry flip-flop 214 just before the time portion of the current change line flows through the memory data gates 800. This is done automatically once every 30 seconds by timing signals which enable an AND gate 216 to set the carry flip-flop 214 at the proper time.

The largest number which can be stored within the 10-bit time portion of a change line is $2^{10} - 1$, or 1,023. If more than 1,023 30-second intervals (about 8½hours) elapse without a new current change line being created, the number within the time portion of the current change line returns to zero, and the carry flip-flop 214 is left still set after the incrementation process is finished. A CARRY signal generated by the flip-flop 214 passes through an OR gate 210 to the J input of the new change line flip-flop 212 and enables the leading edge of the DATA signal to set the new change line flip-flop 212. This initiates the creation of a new current change line, as is shown in FIG. 17. Hence, when the storage capacity of the time portion of the current change line is exceeded, a new current change line is created, and the time measurement process is continued within the time portion of the newly created current change line.

If data is not to be lost, the central unit 44 (FIG. 1) must contact each remote unit 42 (FIG. 1) at least once every time 40 change lines of data are collected. However, telephone service is expensive and therefore no more calls should be made than are absolutely necessary. For maximum economy of operation, the digital computer 40 (FIG. 1) is programmed to keep an average record of how many change lines per each hour of each day of the week are generated by each remote unit. From this record, the computer 40 can calculate the frequency of calls required to provide any desired degree of certainty that no data is lost. The number of calls required will vary widely from remote unit to remote unit and from hour to hour. For example, many more calls will generally be required during the prime viewing hours than at other times, and many more calls will generally be required by a remote unit located in a home having many children than would be required by a remote unit located in a home having no children. If the tuning condition and on-or-off status of a cluster of monitored receivers is altered once every 30 seconds, 40 change lines can be generated in 20 minutes (40 times 30 seconds). If the tuning condition and on-or-off status of a cluster of monitored receivers never changes, it takes about 13 days (40 times 8½hours) to generate 40 change lines. These two extreme cases delimit the range of possibilities.

Referring now to FIG. 13, the time relationship between the various timing signals generated by the system 200 is shown. An OSC signal establishes the basic timing pattern for the system 200. STROBE, PH 1, and PH 2 signals control operation of the shift register memory 1100, and together shift one bit of data out of the memory 1100 every 6.5 microseconds or so. A BIT timing signal occurs once every 1⅔milliseconds, and samples every 256th bit of data which flows from the memory 1100. As will be explained, only every 256th bit is considered part of the memory 1100 output. The DATA signal is an asymmetrical rectangular waveform which is present (negative) for 20 memory output data bits and then absent (positive) for 10 memory output data bits. The DATA signal defines the basic 30-bit change line timing interval. For every 40 DATA signal fluctuations, one C. L. (current change line) pulse occurs and singles out the current change line as it flows from the memory 1100. After each current change line pulse a 1201 BT signal occurs. This 1201 BT signal extends the duration of the DATA signal by one bit timing interval. This 1201 BT signal is followed by a 0001 BT signal. The C. L. signal, the 1201 BT signal, and the 0001 BT signal occur only once every 2 seconds when the current change line is fed out of the memory 1100. A 30 SX (thirty second) pulse occurs once for every 15 C. L. signals, or once every 30 seconds. The 30 SX pulses initiate the comparison of the data portion of the current change line and data presented by the monitored television receivers.

FIG. 14 shows how the BIT timing signal, when multiplied by the PH 2 timing signal, defines the moment when the MEMOUT (memory output) signal is sampled by the system 200. Only every 256th memory data bit is sampled. However, all of the memory data bits are eventually sampled in this manner. FIG. 14 also shows that 20 of these samplings occur when the DATA signal is present (negative) and that tenoccur when the Data signal is absent (positive). One out of every 40 DATA signal fluctuations occurs simultaneously with the appearance of the current change line at the memory output, as indicated by a C. L. pulse, and this is also shown in FIG. 14. The marker bit flows from the memory 1100 immediately after the current change line flows from the memory 1100, and FIG. 14 shows that the DATA signal is present for 21 bit timing intervals, rather than 20, immediately following the termination of the C. L. signal, so as to allow time for the marker bit to flow from the system memory.

FIG. 15 shows the manner whereby a frequency modulated message is generated. Two tone signals, a divide by 64 signal and a divide by 128 signal, are presented to the FM message generator 1000. The generator 1000 generates an output signal called the FM MESG (frequency modulated message) signal. The FM MESG signal is identical to one or the other of the two tone signals, depending upon which polarity bit flows from the memory 1100. If a zero bit appears, the FM MESG signal is identical to the divide by 128 signal, whereas if a "1" bit appears, it is identical to the divide by 64 signal. After passage through the telephone system or after filtering, the FM MESG signal looses its higher harmonics and becomes the signal labeled "FILTERED MESSAGE," shown at the bottom of FIG. 15. This FILTERED MESSAGE signal is a frequency modulated sinusoid of a type that can be handled by standard telephone frequency modulation reception equipment. The divide by 64 signal, the divide by 128 signal, and the MESG data signal (see FIG. 10) are chosen to fluctuate at such a speed that data is transmitted at only half the maximum possible telephone data transmission rate. Hence, at least two full cycles of sinusoid are used to represent each bit. This insures a high degree of accuracy in data transmission.

FIGS. 16, 17, and 18 show precisely what happens every 30 seconds when the 30 SX signal initiates a comparison of the data portion of the current change line and the contents of the TV data register 900.

FIG. 16 illustrates what normally happens when the condition and status of the monitored receivers have not changed and when the capacity of the current change line time portion has not been exceeded. The 30 SX signal commences simultaneously with the commencement of the C. L. signal, the DATA signal, and the CARRY signal. During the period when the DATA signal is present (negative), the comparison gate 204 (FIG. 2) determines that no changes have occurred low the status of the monitored receivers. Later when the DATA signal is absent (positive), the carry flip-flop 214 and the memory data gates 800 increment by one the number within the 10-bit time portion of the current change line. At some point the carry flip-flop clears so that the CARRY signal terminates (goes positive) before the DATA signal recommences (goes negative). This indicates that the capacity of the time portion of the current change line has not yet been exceeded. At the end of the 50 millisecond long C. L. time interval, both inputs to the gate 210 (FIG. 2) are at a lower level, and therefore the J input to the new change line flip-flop 212 is at a low level. When the DATA signal again commences, the new change line flip-flop 212 is not toggled, and the NEW C. L. (new change line) signal never commences. Hence, no new change line is loaded into the system 200.

FIG. 17 shows the sequence of signals which occur when a new current change line is created by passage of time causing the capacity of the current change line time portion to be exceeded. When this happens, the CARRY signal which commences simultaneously with the DATA signal stays present (negative) through an entire cycle of the DATA signal. The CARRY signal passes through the gate 210 (FIG. 2) to the J input of the new change line flip-flop 212 and is still present when the DATA signal commences a second time. Therefore, the leading edge of the DATA signal toggles the flip-flop 212 and initiates the creation of a new current change line. The C. L. pulse interval in FIG. 17 is approximately 100 milliseconds long, twice as long as it was in FIG. 16. During the second half of this extended C. L. pulse, the oldest change line and the marker bit are discarded, and a new current change line and marker bit are fed into the memory 1100. The NEW C. L. (new change line) signal generated by the flip-flop 212 is present during the latter half of this extended C. L. pulse interval.

FIG. 18 shows the sequence of signals which occur when a new current change line is created due to a change in the condition or status of the monitored television receivers. Sometime during the brief time interval when the data portion of the current change line is compared with the contents of the TV data register 900, the data changed flip-flop 208 (FIG. 2) is set by a pulse generated by the comparison gate 204. This occurs when the comparison gate 204 detects a disagreement between a bit in the MEMOUT signal and a bit in the T signal. The data changed flip-flop generates a signal which passes through the gate 210 (FIG. 2) and flows into the J input of the new change line flip-flop 212, so that the flip-flop 212 is toggled by the second commencement of the DATA signal. This initiates the NEW C. L. signal and the creation of a new change line. The C. L. pulse again is extended to twice its normal length so as to encompass both the old and the new current change lines.

Referring once again to FIG. 2, operation of the system 200 is controlled by a high frequency crystal clock 202. This clock 202 drives a series of serially connected frequency dividing counters 300, 400, 500, 600, and 700. The clock 202 is crystal stabilized so as to generate 2,459,648 pulses per second. This pulse rate causes 30 SX pulses spaced almost exactly 30 seconds apart to appear at the output of the last counter 700 in the chain.

The clock 202 generates OSC pulses which fluctuate once every 0.2 microseconds or so. This OSC pulse signal is fed into a high frequency counter 300 which generates one CLK pulse for every 16 OSC pulses. The high frequency counter 300 also generates three signals which are used to control the flow of data through the memory 1100. These three signals are called the STROBE, PH 1, and PH 2 signals.

The CLK pulses are counted by a BIT counter 400 which generates one BIT pulse for each 256 CLK pulses. FIG. 14 shows that the BIT pulses multiplied by the PH 2 pulses determine which memory output bits are selected for transmission and for further processing by the system 200. The spacing between adjacent BIT pulses determines the basic system bit timing interval, as noted in FIG. 14. The BIT pulses are counted by a data counter 500 which generates 1 DATA pulse for every 30 BIT pulses. As shown in FIG. 14, a DATA pulse encompasses 20 bit timing intervals, and adjacent DATA pulses are separated by 10 bit timing intervals. The DATA pulse and the 10 bit timing intervals which follow define the length of time it takes for a 30-bit change line to flow from the memory 1100.

The DATA signal drives a change line counter 600 which generates a 30-bit long C. L. (current change line) pulse during every fortieth fluctuation of the DATA signal, as shown in both FIGS. 13 and 14. The C. L. pulse is present during the period when the current change line flows from the memory 1100.

When the C. L. pulse terminates, it toggles a 1201 bit flip-flop 222 and causes the flip-flop 222 to generate a 1201 BT signal. This 1201 BT signal inhibits the data counter 500 for one bit timing interval, and thus allows the marker bit to flow from the memory 1100 while the DATA signal is present, as is shown in FIGS. 14 and 16. The 1201 BT signal lasts for only one bit timing interval. The 1201 BT signal is also used to clear the TV data register 900, the data changed flip-flop 208, and the carry flip-flop 214 after the comparison and memory loading steps have been completed.

The 1201 BT signal enables a 0001 bit flip-flop 224 to be set by a BIT timing pulse for one bit timing interval. The 0001 bit flip-flop generates a 0001 BT signal. The 0001 BT signal loads data into the TV data register 900 once every 2 seconds, and thus prepares the register 900 for the comparison and change line generating procedures. The 0001 BT signal also clears the 1201 BT flip-flop. The 0001 BT flip-flop is then cleared by the next BIT pulse.

A divide by 15 counter called the 30 second counter 700 counts the C. L. pulses and generates a 30 SX (30 second) output pulse simultaneously with the generation of every 15 C. L. pulse. This 30 SX pulse sets the carry flip-flop 214 and thus increments the number within the time portion of the current change line by one. The 30 SX pulse also partially enables the gate 206, and thus initiates a comparison of the data portion of the current change line with the contents of the TV data register 900. These two functions of the 30 SX pulse are described in the following two paragraphs.

The 30 SX pulse sets the carry flip-flop 204 by flowing through a gate 216 during the data portion of the time when the current change line is fed out of the memory 1100. When the time portion is fed from the memory 1100, the gate 216 is disabled by the absence of the DATA signal at its input; similarly, during the period when a new change line is fed into the memory 1100, the gate 216 is disabled by the presence of the inverted NEW C. L. signal at its input. Hence, the 30 SX signal holds the carry flip-flop 214 set only while the data portion of the current change line flows from the memory 1100 and releases the flip-flop 214 to increment the time portion of the current change line.

The 30 SX signal initiates a comparison by enabling the gate 206 to pass the comparison gate 204 output signal to the set or S terminal of the data changed flip-flop 208. The DATA signal is also fed into the gate 206 to limit the comparison to the data portion of the current change line. The BIT and PH 2 signals jointly strobe the gate 206 only once for every 256 memory output bits, so that only every 256th memory output bit is compared to the data presented by the TV data register 900. This is in accord with the practice throughout the system 200 of disregarding 255 out of every 256 memory output bits.

The 30 second counter 700 also generates an approximately square wave signal called the 30 SEC signal. This signal is used by the telephone transmitting unit 34 (FIG. 1) to time how long the unit 34 remains "off hook" after an inquiry from the central unit 44 (FIG. 1). The details of the timing circuit used by the unit 34 are not shown, since any suitable timing arrangement could be used as well. It only takes 2 seconds to transmit the contents of the memory 1100 (FIG. 2) to the central unit 44. However, transmission errors may occur, and therefore the unit 34 is allowed to remain in "off hook" for one-half minute or more, sufficient time to transmit the contents of the memory 1100 15 times over. The central unit 44 does not usually require this much time to receive the transmission, so as soon as a complete, error-free transmission has been stored in the data interface unit 1200, the receiving unit 36 goes "off hook" and initiates another call.

An examination of FIGS. 17 and 18 reveals that the C. L. (current change line) endures for twice the usual time when a new change line is created. This double duration of the C. L. pulse encompasses both the old and the new current change lines, and thus effectively shifts the C. L. signal away from simultaneity with the former current change line and into simultaneity with the new current change line. Referring to FIG. 2, a C. L. HOLD (change line counter hold) signal prevents one negative leading edge of the DATA signal from advancing the change line counter 600 and thus doubles the length of the C. L. pulse. The C. L. HOLD signal is generated by an OR gate 210. As mentioned above, a signal is present at the output of the OR gate 210 whenever a new change line is to be read into the memory 1100. This C. L. HOLD signal passes through an AND gate 226 on its way to the counter 600. The gate 226 is disabled by the new change line flip-flop 212 whenever the flip-flop 212 is set, and thus prevents a second, undesired, inhibition of the counter 600 by the C. L. HOLD signal after a new change line has been created.

As mentioned briefly above, incrementation of the number stored within the time portion of the current change line is carried out automatically once the carry flip-flop 214 is set. The flip-flop 214 generates a CARRY signal that is supplied to the memory data gates 800. When the time portion of the current change line appears in the MEMOUT signal, the CARRY signal reprograms the memory data gates so that the MEMIN signal is no longer identical to but is reversed in sign from the MEMOUT signal. The CARRY signal is terminated when a "0" bit flows from the memory 1100, as indicated by a "0" detection gate 220. The gate 220 is strobed by the BIT and PH 2 timing signals to insure that only every 256th bit of data in the MEMOUT signal is sampled, in accordance with the usual system 200 procedure (see FIG. 14). The gate 220 is also strobed by the inverted DATA signal to prevent "0" bits in the data portion of the current change line from clearing the carry flip-flop 214. The CARRY signal is terminated only after the first "0" bit has been inverted and fed back into the memory 1100 as a "1" bit. The PH 2 timing signal which clears the carry flip-flop 214 occurs only after the leading (negative going) edge of the STROBE signal strobes the inverted "0" bit into the memory 1100 (see FIG. 13), as will be explained in more detail below. Hence, all the least significant "1" data bits and the least significant "0" data bit in the time portion of the current change line are reversed in sign, while the more significant bits are not disturbed. FIG. 16 illustrates the signal waveforms which occur at this time.

This procedure effectively adds "1" to the binary number stored within the time portion of the current change line. Suppose, for example, that 23 30 second intervals have elapsed since the current change line was fed into the memory 1100, so that the time portion of the current change line contains the number 23 in binary form: "0,000,010,111". Suppose in addition that another 30 second time interval now passes. The procedure outlined above reverses the sign of the three least significant "1" bits and the least significant "0" bit. This converts the above binary number into "0,000,011,000", or 24.Hence, "1" is added to the binary number stored within the time portion of the current change line by the above procedure.

The maximum number which can be stored in the time portion of the current change line is "1,111,111,111" or 1,023.If 1,024 30 second time intervals elapse, an overflow of the time portion occurs. The time portion of the current change line is then set equal to "0,000,000,000", and the carry flip-flop 214 remains set at the end of the procedure. Hence, the CARRY signal is still present when the leading edge (negative going) of the DATA signal reoccurs. As discussed above, the continued presence of the CARRY signal at this point in time makes it possible for the DATA signal to toggle the new change line flip-flop 212 and to cause the creation of a new current change line. The system 200 then commences keeping a record of elapsed time in the time portion of this newly created current change line. The signal waveforms which occur at the time when such an overflow occurs are illustrated in FIG. 17.

The characteristics of the memory 1100 are such that bits must be shifted through the memory at a high rate of speed if bits are not to be lost. The optimum memory circulation speed is too fast for direct memory output transmission over conventional telephone lines, and it is therefore necessary to slow down the data presentation rate to a speed suitable for telephone transmission. This is done by the bit counter 400. The bit counter 400 generates one BIT pulse 6 ½ microseconds long every 1 ⅝ milliseconds. The BIT signal, when multiplied by the PH 2 signal, singles out every 256th bit presented by the memory 1100 for transmission and for processing by the system 200, as indicated in FIG. 14. The memory 1100 contains 1,201 storage locations. Since 1,201 and 256 contain no common primes, it is possible to extract from the memory 1100 every bit which it contains by sampling every 256th bit 1,201 times in succession. Bits are thus sampled at a speed that is 256 times slower than the basic memory bit circulation speed. The entire system 200 is designed around the concept that only every 256th memory output bit is considered part of the memory output. In most of the discussions both above and below this technique of sampling only every 256th bit is not mentioned, and it is assumed that bits are fed out of the memory 1100 one at a time at a slow rate that is suitable for telephone transmission. This is done only to simplify the discussions.

B. Details of the System

In the preferred embodiment of the present invention, the system 200 is constructed using resistor-transistor integrated logic circuitry (RTL). This particular line of logic circuitry includes one basic gate configuration which can be used as a NAND logic element, as a NOR logic element, as an inverting or NOT logic element, and (when two are connected in series) as an OR or an AND logic element. The basic feature of the RTL logic gate is that its output goes positive only when all of its inputs are at ground level. An example of such a gate used as a NAND gate is a gate 310 shown in FIG. 3. An example of such a gate used as a NOR gate is a gate 810 shown in FIG. 8. An example of such a gate used as an inverting or NOT gate is a gate 702 shown in FIG. 7. When two gates are hooked in series, the result is a noninverting gate such as the AND gate 402 shown in FIG. 4. The gate 402 produces a ground level output if and only if all of its inputs are at ground level.

Throughout the remainder of this specification only rarely will any mention be made of whether a signal is at a high level, at ground level, or inverted. For the most part, only the presence or absence of a signal will be mentioned. The logic diagrams accompanying this specification clearly indicate all inverted signals either by overlining of the signal name or by separation of the signal line from adjacent gates with inverting circles. Thus, for example, the STROBE and the CLK signals which flow into the gate 312 are noninverted, while the PH 2 signal coming out of the gate 312 is inverted, as indicated both by overlining and also by the inverting circle at the gate 312 output. Whenever a signal is said to be present, the associated signal line is at ground level if the signal is not inverted, or is positive if the signal is inverted. Similarly, whenever a signal is said to be absent, the associated signal line is positive if the signal is not inverted, and is at ground level if the signal is inverted. For example, a sentence might read in part: "Since signals are present at all the inputs to the NOR gate 312, the gate 312 generates an output signal called the PH 2 signal". FIG. 3 reveals that the signals flowing into the gate 312 are noninverted and the signal flowing out of the gate 312 is inverted. Thus one may conclude that all the inputs to the gate 312 are at ground level, and the output of the gate 312 is positive.

Three types of flip-flops are used in the system 200. Simple set-reset flip-flops are used for elementary memory and control functions. JK flip-flops are used in ripple counters. D type flip-flops are used in shift registers.

A typical set-reset flip-flop is the flip-flop 208 shown in FIG. 2. The flip-flop 208 is constructed from two gate elements having their inputs and outputs cross-connected (see, for example, the two gate bistable circuit 1214 shown in FIG. 12). A signal at the S input commences a signal at the Q output, while a signal at the C input terminates the signal at the Q output. An inverted or $\overline{Q}$ output is also provided.

A typical JK flip-flop is the flip-flop 502 shown in FIG. 5. The JK flip-flop 502 has two outputs, a noninverted output labeled Q and an inverted output labeled $\overline{Q}$. The flip-flop 502 has J and K inputs, the J input located opposite the Q output and the K input located opposite the $\overline{Q}$ output. The flip-flop 512 also has a toggle or clock input labeled T. When the J and K inputs are at ground potential, the flip-flop 502 toggles each time a negative going transition occurs at the toggle or T input. When the J and K inputs are at opposing levels, the Q output is shifted to the same level as the J input when the toggle or T input receives a negative going level transition, and simultaneously the $\overline{Q}$ output is shifted to the same level as the K input. If the J and K inputs are both at a positive level, then the flip-flop 512 remains in the same state following a negative transition of the T or toggle input. If both the J and K inputs are grounded, they are often not shown, as in FIG. 4, JK flip-flops occasionally come equipped with set (S) and clear (C) terminals similar to those found on all set-reset flip-flops.

A typical D type flip-flop is the flip-flop 302 shown in FIG. 3. In place of the J and K inputs, the D type flip-flop 302 has a single D input opposite the Q output. In response to a negative going level transition at the T or toggle input, the flip-flop 302 changes its state so as to match the Q output level to the D input level. If the flip-flop 302 has its $\overline{Q}$ output tied to its D input, as is the case with the flip-flop 302, it toggles with each negative level transition of the T or toggle input.

The various counters used in the system 200 are disclosed in FIGS. 3 to 7. The first of these is the high frequency counter 300 shown in FIG. 3. The counter 300 accepts the high frequency OSC (oscillator) pulses from the clock 202 and generates one output CLK (clock) pulse for each 16 OSC pulses received. The counter 300 also generates three different timing signals which are used to gate information through the shift register memory 1100 (shown in FIGS. 2 and 11).

The OSC pulses are first applied to a mod 4 (divide by 4) ripple counter comprising the two D type flip-flops 302 and 304. These flip-flops 302 and 304 are wired as toggle flip-flops with their $\overline{Q}$ outputs and D inputs tied together. The OSC pulses are applied to the T input of the flip-flop 302, and the output of the flip-flop 302 is connected to the T input of the flip-flop 304. The inverted output of the flip-flop 304 is then fed into the T inputs of two D type flip-flops 306 and 308. The flip-flops 306 and 308 function as a mod 4 switch-tail ring counter. The inverted output of the flip-flop 306 is fed into the D input of the flip-flop 308, and the noninverted output of the flip-flop 308 is fed into the D input of the flip-flop 306. It takes 4 pulses from the flip-flop 304 to drive the two data bits within the flip-flops 306 and 308 around the ring counter twice and back to their starting positions with their original polarity.

The CLK signal is taken from the output of the flip-flop 306. This signal is a symmetrical square wave, as shown in FIG. 13. The inverted output of the flip-flop 308 is called the STROBE signal. This signal is also a square wave, as shown in FIG. 13, and is in quadrature relationship with the CLK signal. Two additional signals, an inverted PH 1 signal and in inverted PH 2 signal, are generated by feeding selected outputs of the flip-flops 302 through 308 into two NAND gates 310 and 312. The gate 312 is enabled by the simultaneous presence of the STROBE signal, the CLK signal, the noninverted output of the flip-flop 304, and the inverted output of the flip-flop 302. These signals are all present for approximately 4/10ths of a microsecond just prior to the termination of the CLK signal, as shown in FIG. 13, and so this is when the PH 2 signal appears. The gate 310 is enabled by the simultaneous absence of the CLK and STROBE signals together with a noninverted output signal from the flip-flop 304. There is no connection to the flip-flop 302. The PH 1 signal appears just prior to the commencement of the CLK signal, and since it is not shortened by a signal from the flip-flop 302 it lasts for 8/10ths of a microsecond, twice as long as the PH 1 signal. The PH 1 and PH 2 signals are both used to drive data through the MOS-FET portions of the shift register memory 1100. The PH 2 signal is also used to strobe the MEMOUT signal whenever a data bit is extracted from the system memory.

FIG. 4 shows the bit counter 400. The counter 400 receives as an input the CLK signal generated by the high frequency counter 300 and generates one BIT output pulse for every 256 CLK input pulses. The duration of this BIT output pulse is from one negative transition of the CLK signal to the next, or about 6 ½ microseconds, as shown in FIG. 13. Each BIT pulse lasts long enough for one bit of data to be read out of the memory 1100. The BIT pulses make up a BIT signal and are spaced approximately 1 ⅔ milliseconds apart. This is sufficient spacing so that 255 memory bits flow out of and back into the shift register memory 1100 between each successive BIT pulse. It will be remembered that only every 256th memory output bit is sampled during the normal operation of the system 200. It is the BIT timing pulses that determine which memory data bits are sampled. More particularly, it is during the PH 2 pulse portion of each BIT timing pulse that data at the memory output is sampled, as is shown in FIG. 14.

The counter 400 comprises a conventional JK flip-flop mod 256 ripple counter, as shown in FIG. 4. An output from each of eight flip-flops comprising the counter 400 is connected to the input of an AND gate 402. When all of the flip-flops are in that state which enables the AND gate 402, the BIT signal appears at the AND gate 402 output. Divide by 64 and divide by 128 output signals are also taken from the sixth and seventh flip-flop stages of the counter 400 for use in the FM message generator 1000 (shown in FIGS. 2 and 10). The output from the seventh stage is called the divide by 128 signal because it is a square wave whose frequency is 1/128th the frequency of the CLK signal. Similarly, the output of the sixth flip-flop stage is called the divide by 64 signal, since it is a square wave whose frequency is 1/64th of that of the CLK signal. The divide by 64 and the divide by 128 signals are shown in FIG. 15, and their function in the system 200 is discussed elsewhere.

FIG. 5 shows the data counter 500. This counter 500 receives as an input signal the BIT signal generated by the bit counter 400 (shown in FIG. 4). Its output is an asymmetrical square wave called the DATA signal. As shown in FIG. 13, the DATA signal normally remains present (negative) for a count of 20 BIT pulses, and then terminates (goes positive) for a count of 10 BIT pulses. Hence, the counter 500 is a mod 30 counter.

The first four flip-flops 502, 504, 506, and 508 within the counter 500 are interconnected in such a manner that they form a divide by 10 counter. The input flip-flop 502 receives at its T input the BIT timing pulses, and thus toggles once each time the BIT signal commences. The flip-flop 502 functions as a divide by 2 flip-flop. It's two outputs are respectively connected to the T inputs of the flip-flops 504 and 506, as shown. The flip-flops 504, 506, and 508 are interconnected as shown in FIG. 5, and all unused inputs are connected to ground as shown.

To aid in understanding how this divide by 10 counter functions, assume that the flip-flops are initially cleared (Q outputs positive) and that 10 BIT pulses are applied to the T terminal of the flip-flop 502. The following truth table is then generated by the four flip-flops 502, 504, 506, and 508. S and C respectively stand for set and clear.

| After BIT pulse number | State of flip-flops 502 | 504 | 506 | 508 |
|---|---|---|---|---|
| | C | C | C | C |
| 1 | S | C | S | S |
| 2 | C | S | S | S |
| 3 | S | S | S | S |
| 4 | C | C | S | S |
| 5 | S | C | C | S |
| 6 | C | S | C | S |
| 7 | S | S | S | C |
| 8 | C | C | S | C |
| 9 | S | C | C | C |
| 10 | C | C | C | C |

Hence, 10 input BIT pulses cause the output flip-flop 508 to be toggled exactly once.

The two remaining flip-flops 510 and 512 within the data counter 500 comprise a divide by 3 counter, and are arranged so that the output flip-flop 512 is in a first state for 1 count and in a second state for 2 counts. The toggle inputs of both flip-flops are connected to the output of the flip-flops 508. The flip-flop 512 is a D type flip-flop and has its D input connected to the Q output of the flip-flop 510 in shift register fashion. The Q output of the flip-flop 512 is fed back into the K input of the JK flip-flop 510. The J input of the flip-flop 510 is grounded.

If initially both the flip-flops 510 and 512 are set (with their Q outputs at ground potential), the first negative level transition generated by the flip-flop 508 clears the flip-flop 510, because both its J and K inputs are grounded, but does not affect the flip-flop 512, because the flip-flop 512 D input level matches its Q output level. The second negative level transition generated by the flip-flop 508 toggles both the flip-flops 510 and 512, leaving the flip-flop 510 set once again and leaving the flip-flop 512 cleared. This happens because both inputs to the JK flip-flop 510 are grounded, and because the D input of the flip-flop 512 is not at the same potential as the Q output of the flip-flop 512 when this negative level transition occurs. The third negative level transition generated by the flip-flop 508 then sets the flip-flop 512, since again its D input and Q output do not match, but does not clear the flip-flop 510, since its inputs and outputs match. Hence, after three negative level transitions the two flip-flops 510 and 512 are returned to their original set states. In this manner, a count of "3" is obtained, and the desired DATA output signal is generated, as shown in FIG. 13.

The K input to the flip-flop 502 is supplied with the inverted 1201 BT signal. This is an inhibit signal. When this signal is present, it locks the flip-flop 502 in the set state, and thus prevents the data counter 500 from advancing. It is necessary to inhibit the data counter 500 for one bit timing interval whenever the marker bit is fed out of the memory 1100 (shown in FIG. 2) so that the precise time relationship between fluctuations of the DATA signal and the appearance of change lines in the MEMOUT signal is not disturbed. The data counter 500 measures out the 30 bit long change lines up until the time when the marker bit appears. When the marker bit appears, the counter 500 is disabled for 1 count, and then recommences measuring out 30 bit change lines once again. FIGS. 14 and 16 show this quite clearly. Immediately following the termination of the C.L. signal in both of these figures, the negative portion of the DATA signal is 21 bit timing intervals in length, rather than 20 as it is at all other times.

FIG. 6 shows the change line counter 600. The change line counter 600 is basically a mod 40 counter which counts the 40 change lines as they flow from the system memory 1100. Since the DATA signal fluctuates once each time a change line is fed out of the memory 1100, the DATA signal is used as an input signal to the change line counter 600. The output of the change line counter 600 is called the C. L. (current change line) signal. The C. L. signal is present only when the current change line is fed out of the system memory 1100. When a new current change line is created, the C. L. signal is extended to double its normal length so that it can encompass both the old and the new current change lines.

The change line counter 600 is constructed from six JK flip-flops 602, 604, 606, 608, 610, and 612. The first two flip-flops 602 and 604 are connected to form a conventional divide by 4 ripple counter, as shown in FIG. 6, with the DATA signal driving the T input to the first flip-flop 602. The output of the flip-flop 604 is the divide by 4 counter output, and is fed into the T input of the flip-flop 606. The remaining four flip-flops 606, 608, 610, and 612 are connected together to form a divide by 10 counter. The flip-flops 606, 608, 610, and 612 are interconnected in exactly the same manner as are the flip-flops 502, 504, 506, and 508 (FIG. 5), and they perform in exactly the same manner to give the desired divide by 10 count. A four input AND gate 614 has its inputs connected to the outputs of four flip-flops in such a manner that signals are simultaneously present at all four inputs only when the counter 600 is in a selected one of its 40 possible states. The first input to the gate 614 connects to the inverted output of the flip-flop 602; the second to the noninverted output of the flip-flop 604; the third to the noninverted output of the flip-flop 608; and the fourth to the inverted output of the flip-flop 612.

The C. L. HOLD signal is supplied to the J input of the flip-flop 602. This signal acts as an inhibit signal for the counter 600 in the same manner that the 1201 BT signal acts as an inhibit signal for the counter 500 shown in FIG. 5.

FIG. 7 shows the 30 second counter 700 which generates the 30 SX pulses. The counter 700 is a mod 15 counter which counts the C. L. (current change line) pulses. Since the C. L. pulses are spaced two seconds apart, the 30 SX pulses are spaced 30 seconds apart. The counter 700 consists of five flip-flops 702, 704, 706, 708, and 710 connected together to form a conventional JK flip-flop divide by 32 ripple counter. The inverted output of the flip-flop 710 is connected to an inverted set terminal S of the first flip-flop 702 and serves to immediately set the first flip-flop 702 when a count of 16 is reached. An inverted 1201 BT pulse applied to an inverted clear terminal C of the flip-flop 710 then clears the flip-flop 710, limiting the duration of the 30 SX pulse to 50 or 100 milliseconds. The count goes directly from 16 back to 1 rather than to zero, and a count of 15 is achieved. The 30 SX pulses appear at the Q output of the flip-flop 710. As shown in FIG. 13, the 30 SX pulses occur simultaneously with the occurrence of every 15 C. L. pulse. Hence, the 30 SX pulses encompass the entire time interval during which the current change line is fed out of the system memory.

The noninverted output of the flip-flop 708 is called the inverted 30 SEC (thirty second) timing signal, and is used by the telephone transmitting unit 34 (FIG. 1) to control the time which the unit 34 remains "off hook" after receiving a ringing signal from the telephone system.

FIG. 8 shows the details of the memory data gates 800. As shown in FIG. 2, these gates receive the MEMOUT (memory output) signal from the shift register memory 1100 and generate the MEMIN (memory input) signal which is fed back into the shift register memory 1100. As an additional source of signals, the memory data gates 800 receive the T (television data) signal from the TV data register 900 whenever a new change line is to be fed into the memory 1100. In addition to timing signals from the various counters 300 through 700, the memory data gates 800 receive the CARRY signal from the carry flip-flop 214 and the NEW C. L. (new change line) signal from the new change line flip-flop 212. The CARRY signal by its presence indicates that arithmetic is being performed; that there is a carry bit left over from the last incremental addition step; and that therefore the sign of the next current change line time portion bit to flow from the memory 1100 is to be reversed before the bit flows back into the memory 1100 again. The NEW C. L. signal by its presence indicates that a new current change line is to be created; and that this new current change line is to include a data portion identical to the data presented by the T signal, and a time portion containing the binary number 0. The memory data gates also automatically reverse the polarity of the marker bit each time it appears. Since 255 out of 256 data bits which flow from the memory 1100 are totally ignored by the system 200, 255 of every 256 data bits are always allowed to flow directly through the memory data gates 800. Inversion or substitution is only carried out on every 256th data bit.

Referring now to FIG. 8, the MEMOUT signal normally flows directly through two gates 804 and 806 and becomes the MEMIN signal. This flow is only interrupted when the NAND gate 804 is disabled by a NOR gate 802. When the gate 804 is disabled, binary "0"s appear at the output of the NOR gate 806, or else alternative data flows to the NOR gate 806 from a NAND gate 808. This alternative data can be either the T signal or the MEMOUT signal in inverted form.

If the NOR gate 802 receives an inverted or positive level signal at any of its four inputs, the signal flows through the NOR gate 802 and enables the NAND gate 804 to pass the MEMOUT signal. The first (uppermost) input to the NOR gate 802 is connected to the BIT timing signal. The absence of the BIT timing signal is interpreted by the gate 802 as the presence of an inverted signal. Hence, when the BIT signal is absent, a positive level signal flows through the NOR gate 802 and enables the NAND gate 804 to pass 255 out of every 256 memory output bits irregardless of what signals are present at other inputs to the NOR gate 802. This is to insure that only every 256th memory output bit is manipulated in accordance with the convention adopted throughout the data handling system 200 (see FIG. 14). The remaining three inputs to the NOR gate 802 are connected to the outputs of three NAND gates 810, 812, and 814. Normally at least one of the three gates 810, 812, and 814 supplies a signal which enables the NAND gate 804 to pass the MEMOUT signal. When all three of these gates 810, 812, and 814 are disabled simultaneously, the MEMOUT signal is blocked. This happens at three different times: First, once every 2 seconds when the marker bit is fed out of the memory 1100; secondly, once every 30 seconds when the time portion of the current change line is fed out of the memory 1100 and is incremented by one; and thirdly, during the entire interval when a new change line is fed into the memory 1100, as indicated by the NEW C. L. signal.

Once every 2 seconds when the marker bit is about to appear in the MEMOUT signal, the inverted 1201 BT timing signal goes positive and disables the NAND gate 810. Simultaneously the NAND gates 812 and 814 are disabled by the absence of the 30 SX signal at their inputs. When the marker bit makes its appearance, the BIT signal goes negative and cuts off the last possible source of signal for the NOR gate 802. This disables the NAND gate 804. Hence, the marker bit is prevented from flowing through the NAND gate 804. As will be explained below, the marker bit reversed in sign is allowed to reach the gate 806 from another source. Hence, the marker bit is reversed in sign once every 2 seconds.

Once every 30 seconds, when the current change line appears in the MEMOUT signal, the inverted 30 SX signal goes positive and disables the NAND gate 810. Simultaneously the inverted CARRY signal goes positive and disables the NAND gate 814. The data portion of the current change line is allowed to flow through the gate 804 by the DATA signal which flows through the gates 812 and 802 and enables the gate 804. The DATA signal terminates when the time portion of the current change line flows from the memory. This leaves only the BIT signal flowing through the NOR gate 802. Hence, the bits comprising the time portion of the current change line are not permitted to flow through the gate 804 until the inverted CARRY signal is terminated. When the inverted CARRY signal is finally terminated, it flows through the gates 814 and 802 and enables the gate 804 to pass the MEMOUT signal. As will be explained below, these same time bits reversed in sign flow to the gate 806 from another source. Hence, the bits comprising the time portion of the current change line are reversed in sign as they flow through the data gates 800 until the CARRY signal terminates. As explained elsewhere, this procedure increments the number within the time portion by one and thus records the passage of a 30 second time interval.

When a new change line is to be read into the memory 1100, the NAND gate 810 is disabled by the presence of the inverted 30 SX signal and the NAND gates 812 and 814 are disabled by the inverted NEW C. L. signal. The NOR gate 802 receives only the BIT timing pulses, and hence the NAND gate 804 is disabled as each bit of the new current change line is fed to the gate 806 from another source.

It was noted above that during the three time periods when the gate 804 blocks the passage of memory data, "0" bits are loaded into the memory by the NOR gate 806 unless substitute data flows to the gate 806 from the NAND gate 808. During two of these three time periods, the MEMOUT signal in inverted form flows through three gates 822, 820, and 808 to the gate 806, and the MEMIN signal becomes the inversion of the MEMOUT signal. When the marker bit is fed out of the memory 1100 (it will be remembered that the marker bit is reversed in sign each time it recirculates through the memory 1100), an inverted 1201 BT signal flows through a NOR gate 824 and enables the NAND gate 822 to pass the inverted MEMOUT signal. When the 30 SX (30 second) signal is present and the time portion of the current change line is fed out of the memory 1100, the absence of the DATA and the NEW C. L. signals in inverted form plus the presence of the CARRY signal cause a gate 826 to generate a signal which flows through the gate 824 to the gate 822 and thus enables the NAND gate 822 to pass the inverted MEMOUT signal until the CARRY signal terminates.

The third time period during which the gate 804 blocks the passage of memory data is when a new change line is created. During the period when the data portion of the new change line is created, a gate 818 is enabled by the simultaneous presence of the 30 SX, DATA, and NEW C. L. signals to pass the T signal from the TV data register 900 through the gates 820, 808, and 806 so that this T signal becomes the 20-bit data portion of the new current change line. No alternate signal is provided during the period when the time portion of the new current change line is fed into the memory, and hence the time portion is set to binary zero.

The gate 808 is strobed with the BIT timing signal once for every 256 bits of output from the memory 1100. This is done so that 255 of every 256 bits of data are passed directly through the data gates 800 without inversion and without being replaced by the T signal.

FIG. 9 shows the details of the TV data register 900. The register 900 collects data from a number of monitored television receivers, stores the data, and presents the data serially to the comparator gate 204 (FIG. 2) and to the memory data gates 800 (FIG. 2 and 8) in the form of a T signal.

FIG. 9 shows the data register 900 to include 20 D type flip-flops connected in series to form a 20-bit closed loop shift register. In FIG. 9, three of the 20 flip-flops 902, 904, and 906 are shown, and the other flip-flops are represented by the box 908 which is labeled 17 additional stages. The Q outputs of the flip-flops 902 and 904 are connected respectively to the D inputs of the flip-flops 904 and 906. The Q output of the flip-flop 906 and the D input of the flip-flop 902 both connect to the 17 additional stages 908. The 17 additional stages 908 are interconnected in a manner identical to the manner in which flip-flops 902, 904, and 906 are interconnected.

Data from the four television receivers is fed into set terminals of the flip-flops 902, 904, 906, and additional stages 908 after passage through data gates 912, 914, 916, and additional stages 908. Each of these data gates 912, 914, 916, and additional stages 908 has one input connected to an incoming data line from a monitored television receiver, and a second input connected to the 0001 BT timing signal by a line 920. It will be remembered that this 00001 BT timing signal occurs once every two seconds immediately after the marker bit is read out of the memory 1100 (see FIG. 13). The clear terminals of the flip-flops 902, 904, and 906 are all connected to the inverted 1201 BT timing signal by a clear line 922. The 1201 BT timing pulses occur at precisely the time when the marker bit is read from the memory 1100 (see FIG. 13), just before the 0001 BT timing pulses. The toggle or clock inputs of the flip-flops 902, 904, 906, and additional stages 908 are connected to a shift line 924 which is supplied with inverted BIT timing pulses once every 30 seconds when the data portion of the current change line is shifted out of the memory 1100. The signal supplied to the shift line 924 is formed by ANDing together the 30 SX (30 second), DATA, and inverted BIT timing signals.

At the start of each 2 second memory cycle, the inverted 1201 BT signal clears the register 900, and the 0001 BT signal loads the register 900 with data from the monitored television receivers. Once each 30 seconds, as the data portion of the current change line is read out of the memory 1100, the contents of the TV data register 900 are advanced through the register synchronously with the trailing edge of the BIT timing pulses. In this manner, the 20 bits stored within the TV data register 900 are presented as the T data signal simultaneously with the presentation of the 20-bit data portion of the current change line as part of the MEMOUT (memory 1100 output) signal. These two signals are compared by the comparison gate 204 (FIG. 2) to determine if there has been any change in the tuning condition or on-or-off status of the monitored receivers since the time when the current change line was first created. If any change in the data is detected, the data change flip-flop 208 (FIG. 2) is set by an output pulse from the comparison gate 204 and a new current change line is placed into the memory 1100 in the manner described above. Note that the data portion of the new current change line is extracted directly from the T signal, as is shown in FIGS. 2 and 8. Whenever a new current change line is created, the contents of the TV data register 900 are advanced through the register 900 a second time so as to be present in the form of the T signal for inclusion in the new current change line.

In the preferred embodiment of the system 200, five data lines are used to connect each monitored television receiver to the data register 900. Since the register 900 has 20 inputs, it can accommodate as many as four television receivers. This is an arbitrary number, and the data handling system 200 can easily be designed to handle any desired number of television receivers. While the five data lines could be used in any suitable manner, in the preferred embodiment of the system 200 four of the data lines are used to transmit a channel number code or a code number indicating that a monitored receiver is turned off. The fifth data line provides a parity bit.

The outermost two data lines and the center data line connecting each television receiver to the data register 900 are connected to ground by resistors, and the remaining two data lines are connected to a positive potential source by resistors. This serves two purposes. First, it provides an improper parity input signal to the register when no television receiver is connected to the five lines, and thus informs the central computer that no receiver is being monitored. Secondly, these resistors cause large numbers of alternate "1"s and "0"s to be placed into the memory 1100. This helps the centrally located telephone receiving unit 36 (FIG. 1) to synchronize with the incoming FM DATA tone signal. Capacitors connect all of the input lines to ground. These capacitors keep hum and noise from producing false input signals to the resistor-transistor logic gates 912, 914, 916, and additional stages 908.

The monitored receivers are modified so as to generate the data signals that are fed into the TV data register 900. Usually a rotary type switch is connected to the television tuning knob and is arranged to turn with the knob so as to generate the desired 5-bit channel signal code numbers for the register 900. In addition, an additional switch or relay is usually arranged to generate a special overriding 5-bit code when the monitored receiver is turned off. Such switching arrangements are currently used in all existing television monitoring systems, and therefore the particular one used with the system 200 will not be shown or described in detail.

FIG. 10 shows the FM message generator 1000 that is used to generate the FM MESG (frequency modulated message) signal. This signal transfers data presented by the shift register memory 1100 to the central unit 44. The signals associated with operation of the generator 1000 are shown in FIGS. 14 and 15.

The generator 1000 extracts every 256th bit of data from the MEMOUT signal and stores the extracted bits in a D type flip-flop 1002. The MEMOUT signal is applied to the D terminal of the flip-flop 1002, and the flip-flop 1002 is strobed by the BIT timing pulses ANDed together with the PH 2 timing pulses by an AND gate 1004. The resulting BIT · PH 2 timing signals are shown in FIG. 14. The output signal generated by the flip-flop 1002 is called the MESG (message) signal and is shown in FIG. 15. This MESG signal is high or low in accordance with whether the sampled memory data bit is a binary "1" or a binary "0".

Let it be assumed for the moment that the MESG signal has the form shown in FIG. 15 so that the code being transmitted is "01001". When the first "0" bit is transmitted, the MESG signal is absent, and the inverted output of the flip-flop 1002 enables the NAND gate 1008 to pass the divide by 128 signal (generated by the bit counter 400 shown in FIGS. 2 and 4). This divide by 128 signal passes through a NOR gate 1010 and becomes the FM MESG (frequency modulated message) signal. After two cycles of the divide by 128 signal have been transmitted, the MESG signal commences, thus indicating that a "1" bit is to be transmitted next. Commencement of the MESG signal disables the NAND gate 1008 and enables a second NAND gate 1006 to pass the divide by 64 signal (also generated by the bit counter 400). This divide by 64 signal also passes through the gate 1010, and four complete cycles of this signal become part of the FM MESG signal as shown in FIG. 15. The divide by 64 signal is a square wave whose frequency is twice that of the divide by 128 signal. When the two "0" bits are to be transmitted, the MESG signal once again terminates and allows 4 more cycles of the divide by 128 signal to become part of the FM MESG signal. Then the MESG signal again commences and allows additional cycles of the divide by 64 signal to become part of the FM MESG signal. The FM MESG signal is applied directly to telephone lines by the telephone transmitting unit 34 (FIG. 1) either in the form shown in FIG. 15 or after filtering. In either case the message is filtered by passage through the telephone system and reaches the telephone receiving unit 36 as a FILTERED MESSAGE signal (see FIG. 15). This FILTERED MESSAGE signal is a truly frequency modulated signal of a type which can be received directly by the telephone receiving unit 36. The FILTERED MESSAGE signal may contain a considerable amount of transmission noise.

The frequencies of the divide by 128 and divide by 64 signals are chosen so that they are in phase with one another at the moment when a new data bit is loaded into the flip-flop 1002. This insures smooth switching between the two signals as shown in FIG. 15.

The shift register memory 1100 is shown in FIG. 11. The memory 1100 is constructed primarily from six MOS-FET (metal oxide-semiconductor field effect transistor) integrated circuit shift register modules 1102–1112 each of which has the capacity to store 200 bits. These modules are commercially available at the present time, and hence will not be described in detail. The six modules 1102–1112 are connected serially as shown in FIG. 11. Power and shift pulses are supplied to the modules in accordance with the module manufacturer's instructions. Proper operation of the modules can only be obtained if properly timed and shaped strobing signals $\phi$ 1 and $\phi$ 2 are continuously supplied to each module, as shown in FIG. 11. The strobing signals $\phi$ 1 and $\phi$ 2 are respectively generated by high speed high voltage output inverting amplifiers 113 and 114 which are respectively driven by the inverted PH 1 and PH 2 timing signals. In response to the PH 1 timing signal, data bits are moved forward one bit position within the modules. The PH 2 timing signal does not shift data forward, but transfers data bits into interstage buffer storage prior to the next PH 1 data shift pulse. The PH 1 and PH 2 signals are shaped in accordance with the module manufacturer's recommendations.

To provide a proper level signal for driving the input terminal of the first module 1102, a transistor amplifier 1116 is provided which converts the low level RTL signal used elsewhere within the system 200 to a high voltage signal suitable for application to the input of the first module 1102. Similarly, the high voltage output signal of the last module 1112 is fed into a transistor amplifier 1118 which converts this high voltage signal to a low level RTL signal suitable for use in the system 200.

The particular details of the shift register memory 1100 are not important to the present invention, and other forms of memories can be substituted. For example, an acoustical delay line memory can replace the six modules 1102 through 1112 and the flip-flops 1120 and 1122. As another example, an extended shift register of some other form can replace the modules and flip-flops. The MOS-FET memory units were chosen primarily for their very low cost and their small physical size.

The MOS-FET portion of the memory 1100 has a capacity to store only 1200 bits of data. As noted above, the shift register memory 1100 is designed to store 1201 bits of data. The 1201st bit of data is stored in two flip-flops 1120 and 1122 which function as a master-slave pair. The MEMIN (memory input) signal is applied to the D terminal of the master flip-flop 1120, and the Q output of this flip-flop 1120 is connected to the D input of the slave flip-flop 1122. The Q output of the slave flip-flop 1122 is then connected to the MOS-FET module 1102 by the level changing amplifier 1116. The STROBE signal generated by the high frequency counter 300 is connected to the T terminals of both of the flip-flops 1120 and 1122 and simultaneously toggles the two flip-flops each time a (negative going) leading edge of the STROBE signal occurs.

As shown in FIG. 2, the MEMOUT (memory output) signal usually flows directly through the memory data gates 800 and returns to the memory 1100 in the form of the MEMIN (memory input) signal. At certain times the memory data gates 800 do channel new or inverted information into the MEMIN signal, but only for brief intervals spaced 2 seconds apart. Most of the time the memory data gates 800 allow the contents of the shift register memory 1100 to recirculate freely. This means the signal generated by the level converting amplifier 1118 usually flows directly to the D terminal of the flip-flop 1120. For the purpose of explaining the operation of the memory 1100, it will be assumed that this is always the case. The memory contents will therefore be assumed to re-circulate continuously.

The time relationship between the three memory control signals PH 1, PH 2, and STROBE is shown in FIG. 13. The first signal to occur is the PH 1 signal, which lasts for 6/10ths of a microsecond. The PH 1 signal is followed by the (negative going) commencement of the STROBE signal. This in turn is followed by the PH 2 signal which lasts for 4/10ths of a microsecond. The (positive going) termination of the STROBE signal which then occurs has no effect upon the memory 1100.

The PH 1 signal advances data through the MOS-FET modules 1102 to 1112. When the PH 1 signal occurs, data bits are transferred forward one bit position within the modules, and a 1200th data bit appears at the output of the level changing amplifier 1118. This 1200th data bit is presented to the D terminal of the master flip-flop 1120. At the moment, the master flip-flop 1120 contains a 1201st data bit.

The STROBE signal now commences with a negative level transition. This transition loads the new 1200th data bit presented by the MEMOUT signal into the flip-flop 1120 and simultaneously shifts the 1201st data bit from the master flip-flop 1120 into the slave flip-flop 1122.

Finally the PH 2 signal occurs. This signal does not transfer data forward through the MOS-FET modules 1102 to 1112, but transfers each data bit within the MOS-FET modules forward into interstage buffer storage. The PH 2 signal also loads the 1201st data bit presented by the flip-flop 1122 and by the level changing amplifier 1116 into buffer storage preceding the first storage location within the first MOS-FET module 1102.

This completes the data transfer cycle. The next PH 1 signal again advances all of the data out of buffer storage and into the next stage within the MOS-FET modules 1102 to 1112, including the 1201st bit which was presented by the flip-flop 1122. A new data bit is now shifted to the last stage of the last module 1112, ready for transfer to the master flip-flop 1120. In this manner, the shift register memory 1100 continuously circulates 1201 bits of data.

The memory 1100 is given a storage capacity of 1201 bits for two reasons. First, that is the amount of storage space required to store 40 30-bit data sets plus a marker bit. Secondly, 1201 (the memory capacity) and 256 (the memory output sampling rate) have no common prime. If the memory contained only 1200 bits, not all memory data could be retrieved because 1200 and 256 have a common prime: 16. The existence of such a common prime means that many bits in the memory can never be included in the memory output sampling process. In this particular case only 75 bits could be sampled, and the remaining 1125 bits would circulate without ever being sampled.

III. The Data Interface Unit

Referring now to FIG. 12, the interface unit 1200 includes four basic elements. It includes a 1201 bit shift register memory 1204, a digital comparator 1206, a mod 1201 counter 1202, and a bistable circuit 1214 which functions as a data routing switch. Assume the unit 1200 is in operation and is receiving both the X DATA signal and also the TRU SYNC (telephone receiving unit sync) pulses from the data synchronizing unit 2000 (FIGS. 1 and 20). Assume also that initially the bistable 1214 is in such a state that it enables the gates 1212, 1220, 1222, and 1226, and simultaneously disables the gates 1216 and 1228. The X DATA signal then passes freely through the two gates 1212 and 1218 and into the shift register memory 1204. The TRU SYNC pulses flow through the gates 1226 and 1230 to the shift terminal input of the shift register memory 1204 and also to the count terminal of the mod 1201 counter. Hence, the X DATA signal is continuously loaded into the shift register memory 1204, and the mod 1201 counter 1202 is continuously advanced 1 count with each bit that is read into the memory 1204. Data continuously flows out of the shift register memory 1204 in form of the Y DATA signal. This Y DATA signal is continuously compared with the X DATA signal by the digital comparator 1206. The comparator 1206 comprises the three gates 1220, 1222, and 1224. The comparator 1206 is connected in such a manner that an output signal appears and is supplied to a line 1232 whenever the X DATA signal and the Y DATA signal are not identical. This signal enables the gate 1210 to pass a TRU SYNC pulse to the reset terminal of the mob 1201 counter 1202. Hence, whenever the X DATA signal disagrees with the Y DATA signal, the counter 1202 is reset to zero count.

Initially, the data flowing from the memory 1204 bears no relation to the X DATA signal, and hence the counter 1204 is reset randomly approximately every other time a data bit flows from the memory 1204. After 1201 bits of the FM MESG signal have been loaded into the memory 1204, however, the Y DATA signal and the X DATA signal begin to agree with one another. This is because the FM MESG signal comprises 1201 bits that are repeated over and over again. Since the two signals agree, the counter 1202 now begins to count upwards. The count continues until the marker bit appears in the Y DATA signal. It will be remembered that the marker bit is reversed in sign or polarity each time it is transmitted (see FIG. 19). Hence, the next marker bit presented to the comparator 1206 by the X DATA signal is of opposite sign from the marker bit presented by the Y DATA signal. This causes a signal to appear upon the line 1232 which resets the counter 1202 to zero count. The counter 1202 now begins to count successful comparisons between the next 1200 bits of data presented by the memory 1204 and the incoming X DATA signal. If no transmission errors occur, these two signals are identical to one another, and the counter 1202 counts up to 1200 without resetting. If any transmission errors occur, one or more bits of data presented to the comparator 1206 by the memory 1204 do not agree with the corresponding bits presented by the X DATA signal, and the counter 1202 resets to zero before a count of 1200 is reached. The counter 1202 is thus prevented from reaching a count of 1200 until all 1200 bits of change line data have been received twice without any transmission errors.

When the counter 1202 finally reaches a count of 1200, it generates a 1200 COUNT signal which enables the gate 1212 and disables the reset gate 1210. The next TRU SYNC pulse passes through the gate 1212 and changes the state of the bistable circuit 1214. The bistable circuit 1214 then disables the gates 1212, 1220, 1222, and 1226, and simultaneously enables the gates 1216 and 1228. An output signal from the bistable 1214 is simultaneously presented in the digital computer 40 in the form of a READY signal which indicates that the data within the interface unit 1200 is ready for transmission to the digital computer 40. The READY signal initiates an interrupt within the digital computer 40. The gate 1226 is now disabled, so the TRU SYNC pulses are no longer allowed to advance data out of the shift register memory 1204. Instead, the gate 1228 enables both the shift register 1204 and the counter 1202 to be supplied with DC SYNC (digital computer synchronizing) pulses generated by the digital computer 40. The DC SYNC signal presents shift pulses at a much higher rate of speed than the TRU SYNC signal because the digital computer 40 can receive data at a much higher rate of speed than can the telephone receiving unit 36 (FIG. 1). The DC SYNC shift pulses simultaneously advance data out of the shift register memory 1204 in the form of the Y DATA signal and advance the counter 1202. The Y DATA signal is recirculated back into the memory 1204 through the gates 1216 and 1218, so the memory 1204 now recirculates freely. The counter 1202 counts as the memory 1204 recirculates and generates a 1201 COUNT signal each time it reaches a count of 1201. Since the counter 1202 was initially set to zero count when the marker bit first appeared in the Y DATA signal, and since it counts synchronously with the shifting of data through the memory 1204, the 1201 COUNT signal appears each time the marker bit appears in the Y DATA signal. Hence, the digital computer 40 is continuously presented with the entire 1201-bit transmitted data set in the form of the Y DATA signal, and also with a 1201 COUNT synchronizing pulse that tells exactly when the marker bit is presented by the Y DATA signal. The digital computer 40 then simply counts out 30-bit data groups following the occurrence of the 1201 COUNT signal, and thus easily separates the various change lines from one another. When the digital computer 40 has completed the task of data reception, it generates a FINISHED signal which toggles the bistable circuit 1214 and prepares the unit 1200 for reception of the next transmission.

If greater accuracy is desired, the above error-checking procedure can be modified so that an additional comparison to a third transmission is carried out. A check can then be made to see if the bit having reversed sign has changed its location. Additional comparisons beyond three are generally not advisable because of the amount of telephone connect time required, and also because of the greatly increased probability of encountering a transmission error.

IV. Computer Error Checking

As noted at the beginning of this specification, the data interface unit 1200 is not essential and the error-checking procedure can be performed by the digital computer 40 or by a special data interface computer. Care must be taken to insure that this computer does not miss data bits presented by the X DATA signal. If the computer is handling several tasks on a priority interrupt basis, some means for indicating when the computer misses a data bit should be provided. A suitable circuit for giving this indication and for initiating a computer interrupt will be described below in connection with the description of the data synchronizing unit 2000. The computer is preferably programmed in machine or assembly language rather than in compiler language so that unnecessary and time consuming steps are avoided whenever possible. Alternatively, a high speed computer can be used.

A suitable error-checking program for the computer 40 has been written. This program reads 1201 data bits into the computer 40 from the X DATA signal and stores these bits in a linear array. One bit is read into the computer 40 each time the data synchronizing unit 2000 (FIG. 20) generates an SIR (storage is ready) signal, and the SIR signal is terminated by a computer generated WR 1 signal after each bit is read into the computer. If the synchronizing unit 2000 presents a second bit before the WR I signal has been generated and terminated, the synchronizer 2000 generates an OVR (overrun) signal. The OVR signal indicates that a data bit has probably been lost. In response to the OVR signal the computer 40 begins the error-checking procedure from the start, discarding all data received previously.

When 1201 bits have been stored in the linear array, the next 1201 bits of data are sequentially compared to the first 1201 bits. When a first bit is received that disagrees in sign with the corresponding bit in the linear array, the array location of this bit is recorded. The comparison procedure is then continued. When a second bit is received that disagrees with the corresponding bit in the linear array, the array location of this second bit is compared to the array location of the first bit. If the two locations agree, then all three of the disagreeing bits are assumed to be marker bits and the transmission is assumed to have been received without error. If the two locations do not agree, then one or the other of the bits has been reversed in sign due to a transmission error. In this case, the computer 40 recommences the data reception and error-checking procedure from the start.

Throughout the error-checking procedure it is advisable to have the computer check for the continued presence of the CARRIER PRESENT signal generated by the telephone receiving unit. In addition, the computer can periodically check a clock to insure that transmission does not last longer than the maximum time during which the transmitting unit 34 (FIG. 1) can transmit. Other error checks can also be made by the computer 40 to insure that the dialer and receiving unit are functioning properly.

If a greater degree of accuracy is required, additional comparisons can be carried out to additional transmissions. As mentioned above, these additional comparisons require additional telephone connect time and additional computer time. Therefore, two or three comparisons are considered sufficient for most applications. The chances of encountering a transmission error are increased in proportion to the number of comparisons performed.

V. Data Synchronizing Unit

The data synchronizing unit 2000 is shown in FIG. 20. The unit 2000 converts the relatively unstable RCVD. DATA signal into the uniform and symmetrical X DATA signal. The unit 2,000 also generates the TRU SYNC pulses for the data interface unit 1200.

Referring now to FIG. 20, the RCVD. DATA signal is applied to the J and K inputs of the flip-flop 2002 and is strobed into the flip-flop 2002 by a CLK (clock) signal. This CLK signal occurs 32 times during each bit timing interval for the incoming data. The data bits appear at the outputs of the flip-flop 2002 synchronously with the leading negative going edge of the CLK signal. The Q and $\overline{Q}$ output signals generated by the flip-flop 2002 are connected in shift register manner to the J and K inputs of a flip-flop 2004. The flip-flop 2004 is strobed by the leading (negative going) edge of a STROBE signal applied to the flip-flop's toggle input. The X Data signal appears at the Q output of the flip-flop 2004.

The primary task of the data synchronizing unit 2000 is to generate the STROBE signal at the precise center of each bit timing interval. This is the time when the signal presented by the flip-flop 2002 is most likely to be stable. This is not a trivial task. Level transitions of the RCVD. DATA signal identify the approximate times when bit timing intervals commence, but a long string of consecutive "1"s or "0"s gives no indication of the beginning and the end of each individual bit timing interval. Moreover, the time when level transitions occur can be affected by transmission errors and distortions. Therefore, the average moment at which level transitions occur must be recovered from the RCVD. DATA signal by the unit 2000 and used to control the precise timing of the STROBE signal.

Since the signal generators in the remote units (such as the remote unit 42 in FIG. 1) are crystal controlled, the bit transmission rate is accurately known. Therefore, it is only necessary for the unit 2000 to recover the phase of the incoming data string. The unit 2000 uses a digital filtering arrangement to extract the desired phase data and to average this data over a number of cycles. A crystal oscillator 2006 is provided having a crystal frequency that is identical to the crystal frequency of the crystals in the remote units. The output of this oscillator 2006 is fed through a divide by 128 counter 2008. The output signal generated by the counter 2008 is called the CLK (clock) signal. This signal fluctuates 32 times during each bit timing interval. A mod 32 (divide by 32) counter having a modulus that can be varied by plus or minus 1 is then used to convert the CLK signal into the STROBE signal. The mod 32 counter comprises five flip-flops 2010, 2012, 2014, 2016, and 2018 each having an output connected to the toggle input of the next flip-flop. The phase of the STROBE signal is then varied by altering the modulus of this mod 32 counter. If the STROBE signal commences too early, the modulus is increased to 33. If the STROBE signal commences too late, the modulus is decreased to 31. When properly phased, the STROBE signal commences (goes negative) at approximately the midpoint of each bit timing interval and thus loads incoming data into the flip-flop 2004 at the time when the output of the flip-flop 2002 is most likely to correctly represent the bit being transmitted.

The signal developed by the flip-flop 2002 is fed into a level transition detection circuit 2020. This circuit generates an L.T. (level transition) pulse each time the RCVD. DATA signal fluctuates. Two mod regulating circuits each including a phase comparison gate are then used to compare the timing of each L. T. pulse with the timing of the trailing edge of the STROBE signal. A mod increasing circuit 2022 increases the counter modulus to 33 in response to L. T. pulses which arrive later than the trailing edge of the STROBE signal. This mod increasing circuit 2022 generates a pulse which prevents a CLK pulse from reaching the mod 32 counter. 33 CLK pulses are then required to give a full count rather than 32. This circuit extends the duration of the STROBE signal and brings the trailing edge of the STROBE signal into synchronism with the L. T. pulses. A mod decreasing circuit 2024 decreases the counter modulus to 31 in response to L. T. pulses which arrive earlier than the trailing edge of the STROBE signal. This mod decreasing circuit 2024 generates a pulse that is fed into the mod 32 counter along with the CLK pulses. Only 31 CLK pulses are then required to give a full count. This circuit 2024 shortens the duration of the STROBE signal and brings the trailing edge of the STROBE signal into synchronism with the L. T. pulses. If the RCVD. DATA signal does not fluctuate for a period of time, no L. T. pulses are generated and the mod 32 counter runs freely with a modulus of 32. No significant phase drift is encountered because the difference between the frequency of the crystal oscillator 2006 and the frequency of the crystal oscillator in the home unit can be less than $2\times 10^{-4}$ seconds per bit. At this rate it would take at least 5000 bit timing intervals for the unit 2000 to drift one bit timing interval. As noted above, the system 20 is designed so that level transitions in the transmitted signal occur quite frequently.

A starting circuit 2026 is provided to stop the mod 32 counter at a predetermined count and to start the mod 32 counter synchronously with the first level transition of the RCVD. DATA signal If this circuit were not provided, it would take as many as 16 level transitions of the incoming signal to pull the STROBE signal into proper synchronization with the incoming data bits. This starting circuit 2026 is controlled by the CARRIER PRESENT signal generated by the telephone receiving unit 36 (shown in FIG. 1). As noted above, the CARRIER PRESENT signal commences as data bits begin to appear in the form of the RCVD. DATA signal. When a transmission is terminated, the CARRIER PRESENT signal is also terminated. When the CARRIER PRESENT signal terminates, the starting circuit 2026 allows the mod 32 counter to advance to a count of 17 and then locks the mod 32 counter. When the CARRIER PRESENT signal recommences, the signal enables the starting circuit 2026 to release the divide by 32 counter synchronously with the occurrence of the next L. T. pulse. Since the divide by 32 counter starts with a count of 17, the leading edge of the STROBE signal occurs 15 counts after the L. T. pulse, at approximately the center of a bit timing interval. Hence, the SYNC signal is locked in phase as soon as the first level transition in the RCVD. DATA signal occurs.

The TRU SYNC (telephone receiving unit synchronization) signal is generated by a flip-flop 2028. The flip-flop 2028 is set by an inverted STROBE pulse applied to its toggle input and is immediately cleared by an inverted CLK pulse which is applied to its clear input. The TRU SYNC pulse is a sharply defined pulse that occurs in the middle of each bit timing interval as defined by the X DATA signal.

The mod decreasing circuit 2024 receives as input signals the STROBE signal and the L. T. pulse signal. Both of these signals are fed into a phase detecting gate 2030. The gate 2030 generates an output pulse which clears a flip-flop 2032 only when an L. T. pulse occurs while the STROBE signal is present. The flip-flop 2032 then enables a flip-flop 2034 to be set by the leading edge of the STROBE signal when the STROBE signal next commences. The $\overline{Q}$ output of the flip-flop 2032 is connected to the J input of the flip-flop 2034, and the K input to the flip-flop 2034 is grounded. The toggle input to the flip-flop 2034 is connected to the STROBE signal. The flip-flop 2034 remains set for half of the interval defined by the spacing between successive CLK pulses and is cleared by an inverted CLK pulse. The $\overline{Q}$ output of the flip-flop 2034 clears the flip-flop 2010 prematurely and thus causes the next STROBE signal to be generated after only 31 CLK pulses have been applied to the flip-flop 2010. This reduces the mod 32 counter modulus to 31. The Q output of the flip-flop 2034 is connected to the toggle input of the flip-flop 2032. The K input of the flip-flop 2032 is held positive and the J input is grounded. The flip-flop 2032 is therefore returned to its standby set state when the flip-flop 2034 is set by the STROBE signal.

The mod increasing circuit 2022 receives as input signals the inverted STROBE signal, the L. T. pulse signal, and the Q output signal generated by the flip-flop 2032. These three signals are all fed into a phase detecting NAND gate 2036. When the STROBE signal is not present and the flip-flop 2032 is not cleared, the occurrence of an L. T. pulse causes the gate 2036 to generate a negative pulse and to set a bistable 2038. A NAND gate 2040 is then enabled by the bistable 2038. The next occurrence of the STROBE signal passes through the NAND gate 2040 and clears a flip-flop 2042. The Q output of the flip-flop 2042 clears the bistable 2038 and thus immediately disables the gate 2040. The Q output of the flip-flop 2042 applies a positive level signal to the K input of the flip-flop 2010 and prevents the next inverted CLK pulse from toggling the flip-flop 2010. This increases the mod 32 counter modulus to 33. This same next inverted CLK pulse toggles and sets the flip-flop 2042 which in turn returns the K input of the flip-flop 2010 to ground. The inverted CLK signal is applied to the toggle input of the flip-flop 2042. The K input of the flip-flop 2042 is connected to a positive source of potential, and the J input of the flip-flop 2042 is grounded.

The starting circuit 2026 comprises a flip-flop 2046 and a two input NAND gate 2044. The input signals supplied to the NAND gate 2044 are the L. T. pulse signal and the CARRIER PRESENT signal generated by the telephone receiving unit 46 (shown in FIG. 1). The output of the gate 2044 is connected to a clear terminal of the flip-flop 2046. The K input to the flip-flop 2046 is strapped to a positive potential node while the J input is connected to the CARRIER PRESENT signal by an inverter 2048. The inverted STROBE signal is applied to the toggle input of the flip-flop 2046. The $\overline{Q}$ output of the flip-flop 2046 is then connected to the J input of the flip-flop 2010.

When the CARRIER PRESENT signal terminates, it disables the gate 2044 from passing L. T. pulses and pulls the J input of the flip-flop 2046 to ground. When the mod 32 counter reaches a count of 16, the inverted STROBE signal goes to ground and toggles the flip-flop 2046 so that the $\overline{Q}$ output of the flip-flop 2046 goes positive. This positive level signal is applied to the J input of the flip-flop 2010. At this moment the flip-flop 2010 is set with its Q output at ground level. The next inverted CLK pulse toggles the flip-flop 2010 so that its Q output goes positive and matches the J input. Any further inverted CLK pulses have no effects upon the mod 32 counter. Hence, the mod 32 counter is locked at a count of 16 plus 1 or 17.

When the CARRIER PRESENT signal recommences, it enables the NAND gate 2044. When the RCVD. DATA signal next fluctuates, an L. T. (level transition) pulse passes through the NAND gate 2044 and clears the flip-flop 2046. This causes the $\overline{Q}$ output of the flip-flop 2046, and hence the J input of the flip-flop 2010, to go to ground. The mod 32 counter then resumes counting at a count of 17. The STROBE signal commences 15 counts after this first L. T. pulse. In this manner, the data synchronizing unit 2000 is initially synchronized with the initial fluctuation of the incoming signal and does not normally require additional time to lock into synchronization. Since both the J and K inputs of the flip-flop 2046 are held positive when the CARRIER PRESENT signal is present, further negative transitions of the inverted STROBE signal have no effect upon the flip-flop 2046 until the CARRIER PRESENT signal terminates once again.

The level transition detection circuit 2020 includes two level transition detection flip-flops 2050 and 2052 and an output NOR gate 2054. The flip-flops 2050 and 2052 have their toggle inputs connected respectively to the noninverted and inverted outputs of the flip-flop 2002 so that one or the other of these flip-flops is toggled each time the flip-flop 2002 toggles in response to a fluctuation of the incoming RCVD. DATA signal. The flip-flop 2002 toggles synchronously with the leading edge of a CLK pulse, as was explained above. Since the flip-flops 2050 and 2052 toggle simultaneously with the flip-flop 2002, they also toggle synchronously with the leading edge of a CLK pulse. When a CLK pulse terminates, its trailing edge is applied to the clear inputs of the flip-flops 2050 and 2052 to clear the flip-flops 2050 and 2052. Hence, a short duration positive level pulse appears at the output of one of the two flip-flops 2050 or 2052 each time there is a fluctuation in the RCVD. DATA signal. These positive level pulses are ORed together by the NOR gate 2054 to form the negative going L. T. (level transition) pulse signal.

If error checking is performed by a digital computer, it is desirable to have some form of computer interface circuit which can give an indication whenever data is lost through the computer's failure to collect data bits from the X DATA signal at a sufficiently high rate of speed. Such a circuit is shown in FIG. 20 and is indicated by the reference numeral 2060. This circuit includes two flip-flops 2062 and 2064 and a NOR gate 2066. The flip-flop 2062 has its J input grounded and its K input connected to a positive potential. This flip-flop 2062 is toggled by the leading edge of the STROBE signal at the same moment that data is loaded into the flip-flop 2004. The output signal generated by the flip-flop 2062 is called the SIR (X DATA signal is ready) signal. This SIR signal tells the digital computer that it is now time to sample the X DATA signal. When the computer has sampled the X DATA signal, the computer generates a positive level WR 2 signal which is applied to the clear input of the flip-flop 2062 and thus terminates the SIR signal. The inverted output of the flip-flop 2062 and also the WR 2 signal are ORed together by the NOR gate 2066 and are fed into the J input of the flip-flop 2064. The K input of the flip-flop 2064 is strapped to a positive potential point, and the toggle input of the flip-flop 2064 is connected to the STROBE signal. If the computer does not clear the flip-flop 2062 before the next commencement of the STROBE signal, or if the WR 2 signal is still present at the commencement of the next STROBE signal, the flip-flop 2064 is set generating an OVR (overrun) signal. This signal tells the digital computer that it has probably just lost a data bit, and that therefore the data comparison procedure should be started from the beginning. A WR 1 signal is then generated by the computer and applied to the clear input of the flip-flop 2064 to terminate the OVR signal.

Although the present invention has been described with reference to an illustrative embodiment thereof, it should be understood that numerous other modifications and changes will readily occur to those skilled in the art and it is therefore intended by the appended claims to cover all such modifications and changes that will fall within the true spirit and scope of the invention.

What is claimed as new and desired to be secured by Letters Patent of the United States is:

1. A data storage and transmission system for continuously monitoring a plurality of remotely located digital variables presented by digital variable presentation means, said system comprising:

a plurality of remotely located data handling systems each connected to a geographically proximate cluster of the remotely located digital variable presentation means;

a circulating memory within each data handling system including means for repeatedly presenting the memory contents as a memory output signal;

storage means within each data handling system for storing within the memory data sets containing records of the fluctuations in the associated cluster of digital variables;

a communications link;

a transmitting unit connecting each data handling system to the communications link;

message generating means within each data handling system for presenting data extracted from the memory output signal to the transmitting unit;

a centrally located computer;

a receiving unit connecting the computer to the communications link for transferring signals from the communications link to the computer; and means controlled by the computer for establishing a connection between the receiving unit and any of the transmitting units over the communications link.

2. A data storage and transmission system in accordance with claim 1 wherein the memory contains a marker bit, and further including memory data gates disposed in the memory circulation path for reversing the sign of this marker bit each time the memory data fully circulates.

3. A data storage and transmission system in accordance with claim 1 wherein counting means count the flow of data bits through the memory and actuate the message generator at time intervals spaced apart by the time it takes a fixed number of bits to flow through the memory whereby the data bits comprising the memory output signal are sampled periodically by the message generating means at a sampling rate that is substantially slower than the memory output signal bit presentation rate, said sampling rate being chosen so that the number representing the memory bit capacity has no common primes with the ratio of the memory output signal bit presentation rate to the sampling rate.

4. A data storage and transmission system for continuously monitoring a plurality of remotely located digital variables presented by digital variable presentation means, said system comprising:

a plurality of remotely located data handling systems each connected to a geographically proximate cluster of the remotely located digital variable presentation means;

storage means within each data handling system for preparing data sets containing records of the fluctuations in the associated cluster of digital variables;

a pushdown, recirculating memory within each data handling system which can store a fixed number of data sets presented by the storage means, and wherein all new data sets presented after the memory is full replace the oldest data sets previously placed in the memory;

a communications link;

a transmitting unit connecting each data handling system to the communications link;

message generating means within each data handling system for converting the memory contents into a signal and for presenting the signal to the transmitting unit;

a centrally located computer;

a receiving unit connecting the computer to the communications link for transferring signals from the communications link to the computer; and means controlled by the computer for establishing a connection between the receiving unit and any of the transmitting units over the communications link.

5. A data storage and transmission system for continuously monitoring a plurality of remotely located digital variables presented by digital variable presentation means, said system comprising:

a plurality of remotely located data handling systems each connected to a geographically proximate cluster of the remotely located digital variable presentation means;

a memory within each data handling system;

storage means within each data handling system for storing within the memory data sets containing records of the fluctuations in the associated cluster of digital variables whenever at least one of the digital variables is altered;

digital variable monitoring means connected to the presentation means for actuating the storage means whenever at least one of the digital variables is altered;

a communications link;

a transmitting unit connecting each data handling system to the communications link;

message generating means within each data handling system for converting the memory contents into a signal and for presenting the signal to the transmitting unit;

a centrally located computer;

a receiving unit connecting the computer to the communications link for transferring signals from the communications link to the computer; and means controlled by the computer for establishing a connection between the receiving unit and any of the transmitting units over the communications link.

6. A data storage and transmission system in accordance with claim 5 to which is added timing means for measuring the time which elapses between actuations of the storage means caused by alteration of the digital variables and wherein each data set stored within the memory includes both the digital variables themselves and also a number obtained from the timing means and representing the length of time which elapsed before the next record was recorded.

7. A data storage and transmission system in accordance with claim 5 to which is added timing means for measuring the time which elapses between successive actuations of the storage means caused by alteration of the digital variables and wherein, in addition to the records of the digital variables, a record of the time is transferred from the timing means to the memory each time the storage means are actuated from which record of the time the beginning and end of each time interval during which the digital variables were in the states indicated by the records within the memory can be deduced.

8. A data storage and transmission system for continuously monitoring a plurality of remotely located digital variables presented by digital variable presentation means, said system comprising:

a plurality of remotely located data handling systems each connected to a geographically proximate cluster of the remotely located digital variable presentation means;

a memory within each data handling system;

timing means for measuring the length of time during which the digital variables remain unchanged;

storage means within each data handling system for storing within the memory data sets each containing a record of the fluctuations in the associated cluster of digital variables and a number representing the length of time during which the digital variables remained unchanged;

digital variable monitoring means connected to the presentation means for actuating the storage means whenever there is a change in the digital variables presented by the presentation means;

a communications link;

a transmitting unit connecting each data handling system to the communications link;

message generating means within each data handling system for converting the memory contents into a signal and for presenting the signal to the transmitting unit;

a centrally located computer;

a receiving unit connecting the computer to the communications link for transferring signals from the communications link to the computer; and means controlled by the computer for establishing a connection between the receiving unit and any of the transmitting units over the communications link.

9. A data storage and transmission system in accordance with claim 8 wherein the number portion of each data set is initially zero when the data set first reaches the memory, and further including arithmetic means connecting to the memory for incrementing the number portion of each new data set periodically until another data set is fed into the memory, whereby the number within the number portion of each data set represents the length of time during which the digital variables remained in the state indicated by the record of the digital variables within the same data set.

10. A data storage and transmission system in accordance with claim 9 wherein the memory within each data handling system is a circulating memory which repeatedly presents the memory contents as a memory output signal, further including memory data gates disposed in the memory circulation path for reversing the sign of the memory data bits in response to a carry signal, and wherein the arithmetic means initiates said carry signal periodically as the number portion of the data set most recently presented to the memory flows through the memory data gates and terminates the carry signal after the least significant "zero" bit within the number portion is inverted by the memory data gates.

11. A data storage and transmission system for continuously monitoring a plurality of remotely located digital variables presented by digital variable presentation means, said system comprising:

a plurality of remotely located data handling systems each connected to a geographically proximate cluster of the remotely located digital variable presentation means;
a memory within each data handling system;
storage means within each data handling system for storing within the memory data sets containing records of the fluctuations in the associated cluster of digital variables;
comparison means for periodically comparing the digital variables with the record of the digital variables contained within the data set most recently placed into the memory, said comparison means actuating the storage means whenever the digital variables disagree with the record contained within the data set most recently placed into the memory;
a communications link;
a transmitting unit connecting each data handling system to the communications link;
message generating means within each data handling system for converting the memory contents into a signal and for presenting the signal to the transmitting unit;
a centrally located computer;
a receiving unit connecting the computer to the communications link for transferring signals from the communications link to the computer; and
means controlled by the computer for establishing a connection between the receiving unit and any of the transmitting units over the communications link.

12. A data storage and transmission system in accordance with claim 11 wherein the memory within each data handling system is a circulating memory which repeatedly presents the memory contents as a memory output signal, wherein the comparison means includes a comparison gate into which the memory output signal is fed, and further including serial data presentation means for presenting the digital variables serially to the comparison gate simultaneously with the appearance of the data set most recently placed into the memory within the memory output signal.

13. A data storage and transmission system in accordance with claim 12 wherein the serial data presentation means is a data register having a parallel data input connected to the cluster of digital variables and having a serial data output.

14. A data storage and transmission system in accordance with claim 12 wherein the memory includes memory data gates disposed in the memory circulation path, wherein the serial data presentation means also presents the digital variables serially to the memory data gates, and wherein the comparison means causes the memory data gates to feed the digital variables into the memory as part of a data set which replaces the oldest data set in the memory whenever the digital variables disagree with the record contained within the data set most recently placed into the memory.

15. A data storage and transmission system in accordance with claim 14 wherein the serial data presentation means is a data register having a parallel data input connected to the cluster of digital variables and having a serial data output.

16. A data storage and transmission system for continuously monitoring a plurality of remotely located digital variables presented by digital variable presentation means, said system comprising:
a plurality of remotely located data handling systems each connected to a geographically proximate cluster of the remotely located digital variable presentation means;
a serial circulating memory within each data handling system;
storage means within each data handling system for storing within the memory data sets containing records of the fluctuations in the associated cluster of digital variables;
message generating means within each data handling system for continuously presenting the memory contents as a message signal;
a telephone direct dialing network communications link;
a transmitting unit connecting each data handling system to the communications link including ringing signal responsive means and switching means actuated by said ringing signal responsive means to connect the signal generated by the message generating means to the direct distance dialing network in response to receipt of a ringing signal from the communications link;
a centrally located computer;
a receiving unit connecting the computer to the communications link for transferring signals from the communications link to the computer; and
means controlled by the computer for establishing a connection between the receiving unit and any of the transmitting units over the communications link.

17. A data storage and transmission system for continuously monitoring a plurality of remotely located digital variables presented by digital variable presentation means, said system comprising:
a plurality of remotely located data handling systems each connected to a geographically proximate cluster of the remotely located digital variable presentation means;
a circulating memory within each data handling system repeatedly presenting the memory contents as a memory output signal;
storage means within each data handling system for storing within the memory data sets containing records of the fluctuations in the associated cluster of digital variables;
a communications link;
a transmitting unit connecting each data handling system to the communications link;
message generating means within each data handling system for presenting the output signal to the transmitting unit comprising tone signals having first and second frequencies and gating means controlled by the memory output signal for presenting one or the other of the tone signals to the transmitting unit in accordance with whether the memory output signal represents a "zero" or a "one" data bit;
a centrally located computer;
a receiving unit connecting the computer to the communications link for transferring signals from the communications link to the computer; and
means controlled by the computer for establishing a connection between the receiving unit and any of the transmitting units over the communications link.

18. A data storage and transmission system in accordance with claim 17 wherein the gating means includes a source of timing signals, a flip-flop, a data input to the flip-flop connected to the memory output signal, a toggle input to the flip-flop connected to the source of timing signals, an output from the flip-flop, and gates controlled by the flip-flop output connecting the tone signals to the transmitting unit, whereby the bits which flow from the memory are sampled at a rate determined by the frequency of the source of timing signals.

19. A data storage and transmission system for continuously monitoring a plurality of remotely located digital variables presented by digital variable presentation means, said system comprising:
a plurality of remotely located data handling systems each connected to a geographically proximate cluster of the remotely located digital variable presentation means;
a serial, circulating memory within each data handling system repeatedly presenting the memory contents as a memory output signal;
storage means within each data handling system for storing within the memory data sets containing records of the fluctuations in the associated cluster of digital variables;
a communications link;
a transmitting unit connecting each data handling system to the communications link;
meassage generating means within each data handling system for presenting the memory output signal to the transmitting unit;
a centrally located computer;
a receiving unit connecting to the communications link for receiving signals from the communications link;

means controlled by the computer for establishing a connection between the receiving unit and any of the transmitting units over the communications link; and data interface unit means connecting the receiving unit to the digital computer, said data interface unit means accepting data at a low speed from the receiving unit, storing the data, and then presenting the data at high speed to the digital computer.

20. A data storage and transmission system for continuously monitoring a plurality of remotely located digital variables presented by digital variable presentation means, said system comprising:

a plurality of remotely located data handling systems each connected to a geographically proximate cluster of the remotely located digital variable presentation means;

a memory within each data handling system;

storage means within each data handling system for storing within the memory data sets containing records of the fluctuations in the associated cluster of digital variables;

a communications link;

a transmitting unit connecting each data handling system to the communications link;

message generating means within each data handling system for continuously converting the memory contents into a continuous signal comprising successive memory data transmissions and for presenting the continuous signal to the transmitting unit;

a centrally located computer;

a receiving unit connecting the computer to the communications link for receiving signals from the communications link;

means controlled by the computer for establishing a connection between the receiving unit and any of the transmitting units over the communications link; and data interface unit means connecting the receiving unit to the digital computer, said data interface unit means performing a bitwise comparison of successive data transmissions to insure that no transmission errors have occurred and presenting data to the digital computer only after two transmissions have been received which are identical.

21. A data storage and transmission system in accordance with claim 20 wherein a marker bit accompanies each transmission and is reversed in sign between successive transmissions, and wherein the data interface unit means includes means for indicating to the digital computer which bit is the marker bit.

22. A data storage and transmission system in accordance with claim 20 wherein the data interface unit means comprises:

a serial memory with the capacity to store an entire transmission, said memory having an input into which data from the receiving unit is fed, and having an output;

a counter arranged to count the data bits that flow into the serial memory;

a comparator having two inputs, one connected to the serial memory output and the other receiving data from the receiving unit, and having an output connected to said counter for resetting said counter whenever the two inputs do not match; and data presentation means responsive to said counter reaching a predetermined count for presenting the contents of the memory to the digital computer.

23. A data storage and transmission system in accordance with claim 22 wherein the data presentation means comprises a bistable circuit which changes its state when the counter reaches the predetermined count, said bistable circuit generating a ready signal which initiates an interrupt in the digital computer; and recirculation gates connecting the memory output to the memory input and enabled by the ready signal.

24. A data storage and transmission system in accordance with claim 23 wherein the message generating means includes means for generating a marker signal that accompanies each transmission and that is reversed in sign between successive transmissions, wherein the counter is advanced synchronously with the recirculation of data through the memory, wherein the counter resets with each complete circulation of the data, and wherein the counter generates a signal when the count is reached at which count the marker signal flows from the serial memory.

25. A data storage and transmission system for continuously monitoring a plurality of remotely located digital variables presented by digital variable presentation means, said system comprising:

a plurality of remotely located data handling systems each connected to a geographically proximate cluster of the remotely located digital variable presentation means;

a memory within each data handling system;

storage means within each data handling system for storing within the memory data sets containing records of the fluctuations in the associated cluster of digital variables;

a communications link;

a transmitting unit connecting each data handling system to the communications link;

message generating means within each data handling system for converting the memory contents into a signal and for presenting the signal to the transmitting unit;

a centrally located computer;

a receiving unit connecting the computer to the communications link for transferring signals from the communications link to the computer;

means controlled by the computer for establishing a connection between the receiving unit and any of the transmitting units over the communications link;

a power supply for each data handling system;

batteries for replacing each power supply in case of power failure;

means within each data handling system responsive to a failure of power for transferring electrical power from the corresponding battery to the corresponding data handling system;

battery charging means within said power supply for normally maintaining a full charge on said batteries; and power interrupt detector means connected to the power supply and responsive to a power failure for generating a power off tone whenever a power failure is in progress, said power off tone being fed directly to the transmitting unit.

* * * * *